US010291417B2

(12) United States Patent
Vucina et al.

(10) Patent No.: US 10,291,417 B2
(45) Date of Patent: May 14, 2019

(54) SYSTEM, METHOD AND PROGRAM PRODUCT FOR DELIVERY OF DIGITAL CONTENT OFFERINGS AT A RETAIL ESTABLISHMENT

(75) Inventors: David J. Vucina, Colleyville, TX (US); Gregory G. Williams, Austin, TX (US); James D. Keeler, Austin, TX (US); Scott W. Martin, Austin, TX (US); Todd L. Mathis, Austin, TX (US)

(73) Assignee: WAYPORT, INC., Atlanta, GA (US)

( * ) Notice: Subject to any disclaimer, the term of this patent is extended or adjusted under 35 U.S.C. 154(b) by 544 days.

(21) Appl. No.: 11/959,680

(22) Filed: Dec. 19, 2007

(65) Prior Publication Data

US 2008/0097858 A1    Apr. 24, 2008

Related U.S. Application Data

(63) Continuation of application No. 10/851,633, filed on May 21, 2004, now abandoned.

(51) Int. Cl.
  *G06Q 30/00*   (2012.01)
  *H04L 12/14*   (2006.01)
  (Continued)

(52) U.S. Cl.
  CPC ............. *H04L 12/14* (2013.01); *G06Q 20/20* (2013.01); *G06Q 30/0209* (2013.01);
  (Continued)

(58) Field of Classification Search
  USPC ....................................................... 705/1–28
  See application file for complete search history.

(56) References Cited

U.S. PATENT DOCUMENTS

| | | | |
|---|---|---|---|
| 4,026,642 | A | 5/1977 | Tanaka et al. |
| 4,233,661 | A | 11/1980 | Bolton et al. |

(Continued)

FOREIGN PATENT DOCUMENTS

| | | |
|---|---|---|
| EP | 0 848 338 | 6/1998 |
| EP | 0 889 418 | 1/1999 |

(Continued)

OTHER PUBLICATIONS

"Application Adaptive Bandwidth Management Using Real-Time Network Monitoring", by Amit Grover. East Tennessee State University. Aug. 2003. (Year: 2003).*

(Continued)

*Primary Examiner* — William A Brandenburg
(74) *Attorney, Agent, or Firm* — Toler Law Group, PC

(57) ABSTRACT

A method and system for providing distributed network access point installation and management. A network provider installs and/or operates a plurality of access points at locations of a retail entity. Each access point may provide services such as Internet access, and/or content such as audio, video, text, and/or graphics, among other types of services. A carrier, such as a telephone or cable company, may compensate the network service provider for installation and operation of the access points. The carrier may in turn charge its subscribers for network access at the retail entity locations. A plurality of different carriers may provide compensation and allow respective subscriber access. The network access points may be configured to allow each carrier to present a point of presence to its subscribers at the retail entity locations. The installed network may also provide service for retail entity back office functions.

25 Claims, 15 Drawing Sheets

(51) Int. Cl.
  *G06Q 20/20* (2012.01)
  *G06Q 30/02* (2012.01)
  *H04W 4/24* (2018.01)
  *H04W 88/08* (2009.01)
  *H04L 29/06* (2006.01)
  *H04W 4/02* (2018.01)

(52) U.S. Cl.
  CPC ..... *G06Q 30/0239* (2013.01); *H04L 12/1482* (2013.01); *H04W 4/24* (2013.01); *H04L 63/20* (2013.01); *H04M 2215/2026* (2013.01); *H04W 4/02* (2013.01); *H04W 88/08* (2013.01)

(56) References Cited

U.S. PATENT DOCUMENTS

| | | | |
|---|---|---|---|
| 4,509,277 A | 4/1985 | Bolton | |
| 4,654,793 A | 3/1987 | Elrod | |
| 4,806,743 A | 2/1989 | Thenery | |
| 4,816,654 A | 3/1989 | Anderl et al. | |
| 4,845,504 A | 7/1989 | Roberts et al. | |
| 5,019,697 A | 5/1991 | Postman | |
| 5,030,807 A | 7/1991 | Landt et al. | |
| 5,149,945 A | 9/1992 | Johnson et al. | |
| 5,287,269 A | 2/1994 | Dorrough et al. | |
| 5,321,395 A | 6/1994 | Van Santbrink | |
| 5,351,186 A | 9/1994 | Bullock et al. | |
| 5,365,516 A | 11/1994 | Jandrell | |
| 5,377,060 A | 12/1994 | Nigam | |
| 5,487,103 A | 1/1996 | Richardson, Jr. et al. | |
| 5,538,007 A | 7/1996 | Gorman | |
| 5,606,616 A | 2/1997 | Sprunk et al. | |
| 5,623,601 A | 4/1997 | Vu | |
| 5,664,228 A | 9/1997 | Mital | |
| 5,696,898 A | 12/1997 | Baker et al. | |
| 5,727,950 A | 3/1998 | Cook et al. | |
| 5,761,683 A | 6/1998 | Logan et al. | |
| 5,768,384 A | 6/1998 | Berson | |
| 5,781,909 A | 6/1998 | Logan et al. | |
| 5,805,803 A | 9/1998 | Birrell et al. | |
| 5,835,061 A | 11/1998 | Stewart | |
| 5,845,070 A | 12/1998 | Ikudome | |
| 5,851,149 A | 12/1998 | Xidos et al. | |
| 5,889,958 A | 3/1999 | Willens | |
| 5,892,829 A | 4/1999 | Aiello et al. | |
| 5,936,542 A | 8/1999 | Kleinrock et al. | |
| 5,968,176 A | 10/1999 | Nessett et al. | |
| 5,969,678 A | 10/1999 | Stewart | |
| 5,987,606 A | 11/1999 | Cirasole et al. | |
| 5,991,287 A | 11/1999 | Diepstraten et al. | |
| 5,991,292 A | 11/1999 | Focsaneanu et al. | |
| 5,996,011 A | 11/1999 | Humes | |
| 6,021,201 A | 2/2000 | Bakhle et al. | |
| 6,049,289 A | 4/2000 | Waggamon | |
| 6,130,892 A | 10/2000 | Short et al. | |
| 6,194,992 B1 | 2/2001 | Short et al. | |
| 6,219,694 B1 | 4/2001 | Lazardis et al. | |
| 6,226,277 B1 | 5/2001 | Chuah | |
| 6,226,677 B1 | 5/2001 | Slemmer | |
| 6,233,618 B1 | 5/2001 | Shannon | |
| 6,240,533 B1 | 5/2001 | Slemmer | |
| 6,253,321 B1 | 6/2001 | Nikander et al. | |
| 6,259,405 B1 | 7/2001 | Stewart et al. | |
| 6,285,665 B1 | 9/2001 | Chuah et al. | |
| 6,317,790 B1 | 11/2001 | Bowker et al. | |
| 6,317,837 B1 | 11/2001 | Kenworthy | |
| 6,327,254 B1 | 12/2001 | Chuah | |
| 6,363,421 B2 | 3/2002 | Barker et al. | |
| 6,370,247 B1 | 4/2002 | Takaragi et al. | |
| 6,377,548 B1 | 4/2002 | Chuah et al. | |
| 6,377,982 B1 | 4/2002 | Rai et al. | |
| 6,377,990 B1 | 4/2002 | Stemmer et al. | |
| 6,393,468 B1 | 5/2002 | McGee | |
| 6,393,482 B1 | 5/2002 | Rai et al. | |
| 6,400,722 B1 | 6/2002 | Chuah et al. | |
| 6,414,950 B1 | 7/2002 | Rai et al. | |
| 6,421,714 B1 | 7/2002 | Rai et al. | |
| 6,449,272 B1 | 9/2002 | Chuah et al. | |
| 6,453,419 B1 | 9/2002 | Flint et al. | |
| 6,460,084 B1 | 10/2002 | Van Horne et al. | |
| 6,480,888 B1 | 11/2002 | Pedersen | |
| 6,490,620 B1 | 12/2002 | Ditmer et al. | |
| 6,496,491 B2 | 12/2002 | Chuah et al. | |
| 6,512,754 B2 | 1/2003 | Feder et al. | |
| 6,523,068 B1 | 2/2003 | Beser et al. | |
| 6,564,327 B1 | 5/2003 | Klensin et al. | |
| 6,571,221 B1 | 5/2003 | Stewart | |
| 6,577,643 B1 | 6/2003 | Rai et al. | |
| 6,577,644 B1 | 6/2003 | Chuah et al. | |
| 6,636,894 B1 | 10/2003 | Short et al. | |
| 6,654,610 B1 | 11/2003 | Chen et al. | |
| 6,665,718 B1 | 12/2003 | Chuah et al. | |
| 6,668,322 B1 | 12/2003 | Wood et al. | |
| 6,675,208 B1 | 1/2004 | Rai et al. | |
| 6,704,311 B1 | 3/2004 | Chuah et al. | |
| 6,727,830 B2 | 4/2004 | Lui et al. | |
| 6,732,176 B1 | 5/2004 | Stewart et al. | |
| 6,790,927 B2 | 9/2004 | Inoue et al. | |
| 6,801,509 B1 | 10/2004 | Chuah et al. | |
| 6,829,355 B2 | 12/2004 | Lilly | |
| 6,886,095 B1 | 4/2005 | Hind et al. | |
| 7,009,556 B2 | 3/2006 | Stewart | |
| 7,200,566 B1* | 4/2007 | Moore | G06Q 30/06 705/26.3 |
| 7,310,730 B1 | 12/2007 | Champagne et al. | |
| 7,356,596 B2 | 4/2008 | Ramanujan et al. | |
| 7,370,197 B2 | 5/2008 | Huitema | |
| 7,428,413 B2 | 9/2008 | Fink | |
| 7,614,083 B2 | 11/2009 | Khuti et al. | |
| 7,706,775 B2* | 4/2010 | Uhlik | H04W 84/04 455/406 |
| 7,856,659 B2 | 12/2010 | Keeler et al. | |
| 8,108,916 B2 | 1/2012 | Fink et al. | |
| 8,261,327 B2 | 9/2012 | Keeler et al. | |
| 9,232,077 B2* | 1/2016 | Yu | H04L 12/14 |
| 2001/0044787 A1 | 11/2001 | Shwartz et al. | |
| 2002/0022483 A1 | 2/2002 | Thompson et al. | |
| 2002/0112071 A1 | 8/2002 | Kim | |
| 2002/0132661 A1 | 9/2002 | Lind et al. | |
| 2002/0144144 A1 | 10/2002 | Weiss et al. | |
| 2003/0009382 A1 | 1/2003 | D'Arbeloff et al. | |
| 2003/0117434 A1 | 6/2003 | Hugh | |
| 2003/0126021 A1 | 7/2003 | Mizushima et al. | |
| 2003/0185169 A1 | 10/2003 | Higgins | |
| 2003/0187786 A1 | 10/2003 | Swift et al. | |
| 2003/0194988 A1 | 10/2003 | Knox | |
| 2003/0233329 A1* | 12/2003 | Laraki | G06Q 20/123 705/52 |
| 2003/0233580 A1 | 12/2003 | Keeler et al. | |
| 2004/0128199 A1 | 7/2004 | Cusack et al. | |
| 2004/0141488 A1 | 7/2004 | Kim et al. | |
| 2004/0164898 A1 | 8/2004 | Stewart | |
| 2004/0167929 A1 | 8/2004 | Osborne et al. | |
| 2004/0170153 A1 | 9/2004 | Stewart et al. | |
| 2004/0193464 A1 | 9/2004 | Szrek et al. | |
| 2004/0193906 A1 | 9/2004 | Dar et al. | |
| 2004/0215799 A1 | 10/2004 | Lehmann, Jr. et al. | |
| 2005/0004840 A1* | 1/2005 | Wanninger | G06Q 30/02 705/14.64 |
| 2005/0021781 A1 | 1/2005 | Sunder et al. | |
| 2005/0076108 A1 | 4/2005 | Li et al. | |
| 2005/0086528 A1 | 4/2005 | Darziv et al. | |
| 2005/0094566 A1 | 5/2005 | Hares | |
| 2005/0095180 A1 | 5/2005 | Wieres | |
| 2005/0165711 A1* | 7/2005 | Hamatsu | H04L 63/0853 |
| 2005/0187834 A1 | 8/2005 | Painter et al. | |
| 2005/0261970 A1 | 11/2005 | Vucina et al. | |
| 2005/0270232 A1 | 12/2005 | Masuda | |
| 2006/0050719 A1 | 3/2006 | Barr et al. | |
| 2006/0092955 A1 | 5/2006 | Durbin et al. | |
| 2006/0143701 A1 | 6/2006 | Dos Santos et al. | |
| 2006/0168253 A1 | 7/2006 | Baba et al. | |
| 2006/0189298 A1 | 8/2006 | Marcelli | |
| 2006/0200855 A1 | 9/2006 | Willis | |

(56) References Cited

U.S. PATENT DOCUMENTS

| | | | |
|---|---|---|---|
| 2006/0268902 A1 | 11/2006 | Bonner | |
| 2007/0063015 A1 | 3/2007 | Mebruer | |
| 2008/0022084 A1 | 1/2008 | Raftelis et al. | |
| 2008/0095180 A1 | 4/2008 | Vucina et al. | |
| 2008/0155453 A1* | 6/2008 | Othmer | H04M 1/72572 715/774 |
| 2008/0263652 A1 | 10/2008 | McMurtry et al. | |
| 2009/0031404 A1 | 1/2009 | Bazzinotti et al. | |
| 2009/0150977 A1 | 6/2009 | Carley | |
| 2012/0260320 A1 | 10/2012 | Keeler et al. | |

FOREIGN PATENT DOCUMENTS

| | | |
|---|---|---|
| EP | 0 909 073 | 4/1999 |
| EP | 0 917 320 | 5/1999 |
| EP | 0 986 230 | 3/2000 |
| WO | WO 96/39668 | 12/1996 |
| WO | WO 98/12643 | 3/1998 |
| WO | WO 99/57865 | 11/1999 |
| WO | WO 99/57866 | 11/1999 |
| WO | WO 99/66400 | 12/1999 |
| WO | 03073688 A1 | 9/2003 |
| WO | 2005112598 A1 | 12/2005 |
| WO | 2007060016 A2 | 5/2007 |

OTHER PUBLICATIONS

Non-Final Office Action for U.S. Appl. No. 10/851,633 dated Jan. 10, 2008, 24 pages.
Final Office Action for U.S. Appl. No. 10/851,633 dated Jul. 9, 2008, 22 pages.
Non-Final Office Action for U.S. Appl. No. 10/851,633 dated May 11, 2009, 36 pages.
Final Office Action for U.S. Appl. No. 10/851,633 dated Dec. 24, 2009, 43 pages.
Non-Final Office Action for U.S. Appl. No. 10/851,633 dated Apr. 26, 2010, 15 pages.
Final Office Action for U.S. Appl. No. 10/851,633 dated Nov. 10, 2010, 19 pages.
International Search Report & Written Opinion, Application No. PCT/US2005/017738, published Oct. 10, 2005.
IEEE Standards for Local and Metropolitan Area Networks: Virtual Bridged Local Area Networks, IEEE Std. 802; IQ-1998, Dec. 8, 1998.
Cisco; Single-User Network Access Security TACACS+; Mar. 30, 1995, Cisco White Paper; XP002124521; 9 pages.
D. Brent Chapman, Elizabeth D. Zwicky; Building Internet Firewalls, Nov. 1995; O'Reilly; XP002202789, pp. 131-188 and 191-207.
Susan Hinrichs; "Policy-Based Management Bridging the Gap," Dec. 6, 1999, pp. 209-218.
Get TEAclipper-Ready at Zero Cost, www.flexipanel.com, Nov. 17, 2007, FlexiPanel LTD, London, UK, p. 1.
HexWax Explorer, TEAclipper Firmware Management Utility, HexWax Explorer HW050-1, www.flexipanel.com, Jun. 26, 2007, FlexiPanel LTD, London, UK, pp. 1-3.
iPass Generic Interface Specification, Between Smart Clients and Access Gateway, Mar. 9, 2004, Version 1.3, iPass Inc., Redwood Shores, CA, pp. 2-3, 8-27.
TEAclipper/PIC, Firmware Delivery for Microchip PIC Microcontrollers, TEAclipper/PIC DS508-6, www.flexipanel.com, Jan. 13, 2008, FlexiPanel LTD, London, UK, pp. 1-8.
TEAclipper/Stamp, Firmware Delivery for BASIC Stamps, TEAclipper/Stamp DS507-4, www.flexipanel.com, Feb. 12, 2008, FlexiPanel LTD, London, UK, pp. 1-3.
TEAclipper/USB, USB Adapter for TEAclipper Programming Clips, TEAclipper USB DS510-4, www.flexipanel.com, Dec. 2, 2007, FlexiPanel LTD, London, UK, p. 1.
Edgett, J. et al., Generic Interface Specification, 2003, iPass Inc., Redwood Shores, CA, pp. 2-9.
Schneier, B., One-Way Hash Functions, Applied Cryptography, 2nd Edition, Chapter 18, 1996, John Wiley & Sons, pp. 429-459.

* cited by examiner

SYSTEM, METHOD AND PROGRAM PRODUCT FOR DELIVERY OF DIGITAL CONTENT OFFERINGS AT A RETAIL ESTABLISHMENT

PRIORITY CLAIM

The present application is a continuation of U.S. patent application Ser. No. 10/851,633, filed on May 21, 2004 now abandoned, entitled "Method for Providing Wireless Services."

BACKGROUND

1. Field of the Invention

This invention relates generally to wired and/or wireless network data communications, and more specifically to a system and method for installing and/or providing a network infrastructure in various retail entity locations to offer network services to support customers of one or more carrier entities. The invention also relates to a business method which enables installation and/or provision of wired and/or wireless network services in various retail entity locations.

2. Description of Related Art

Various types of wired and wireless infrastructures are being developed to service users of computing devices, such as portable computing devices (PCDs). Currently, numerous network service providers are attempting to install wireless network infrastructures in various locations, such as airports, hotels, office buildings, shopping malls, fast-food restaurants, coffee shops, and/or fueling stations (e.g., gas stations, truck stops, etc.), among others, for use by various users, such as mobile users (MUs) of PCDs. Typically, most or all of the costs associated with setting up and providing the service at these locations is born by the network service provider. Furthermore, bearing these costs has proven difficult and even financially detrimental to various network service providers. Therefore, a new method is desired which enables installation and maintenance of distributed network access points without imposing financial burdens on a network service provider.

Each of a plurality of different network service providers may wish to provide its own wireless local area network (WLAN). Typically, a WLAN includes one or more wireless access points which communicate in a wireless fashion with a corresponding computing device of a user, which typically includes a wireless Ethernet transceiver. By way of example, IEEE 802.11 currently uses a System ID (SID) (e.g., a Service Set Identifier and/or an Extended Service Set Identifier) to "select" which WLAN to use and the wireless access point with which to associate. Elements of the wired and wireless infrastructure, including each wireless access point, may be able to support a different WLAN for each of the plurality of different network service providers. However, in general, each of the plurality of different network service providers provides its own access controller. In other words, the communications from a WLAN of a first wireless service provider are routed to an access controller of the first network service provider. Even though there is a network infrastructure installed at each location of the retail entity, a second network service provider would install more equipment (e.g., at least one more access controller) to also provide service to the users of the second network service provider. An access controller for each different network service providers may provide separate branding and/or allow authentication schemes for each of the different network service providers. This may produce several problems and/or complications. For instance, if the network infrastructure is installed at a location such as a fast-food restaurant, space may be limited as to how much equipment may be present. Installing an additional access controller for each additional wireless service provider may not be feasible. This may also add several costs. Not only may there be various up-front costs, there may also be on-going additional costs associated with monitoring and/or maintenance of additional equipment.

When multiple service providers install networking equipment at a retail entity location, other drawbacks may become present as well. For example, each location of the retail entity may have only one connection to a network, such as the Internet. The connection may be with a DSL (digital subscriber line), a cable modem, a T–1, satellite connection, or other possibly limited connection. With the use of additional access controllers, use of resources (e.g., bandwidth) of the connection to the network or Internet may become unbalanced or congested. The retail entity itself may also desire to connect to the network or Internet. The retail entity may desire a guarantee of resources of the network connection, such as a guarantee of a minimum bandwidth (e.g., 64 kilobits per second) for certain critical "back office" applications such as real-time credit-card transaction processing. The use of multiple access controllers may contribute to a complicated implementation, even if the implementation is possible.

In essence, rather than having each carrier or entity set up a separate physical and network infrastructure, a single infrastructure can be utilized to provide multiple services to the entities and to provide services to multiple entities.

Therefore, it would also be desirable to provide a system and method which enables a common wireless network infrastructure (and especially an IEEE 802.11 wireless network infrastructure) and a single physical access controller to be used by a network service provider to provide services to different types of subscribers at a potentially much-reduced cost compared to installing and maintaining separate physical and network infrastructures. This would allow a plurality of carriers to utilize a common set of access points at locations of a retail entity to provide service to a potentially non-overlapping set of subscribers. This would also provide subscribers or users with the ability to more fully utilize the existing network infrastructure. It would further be desirable to provide a distributed wireless network system which can selectively provide different access levels to users of the system.

SUMMARY OF THE INVENTION

Various embodiments are disclosed for providing and/or operating one or more wired and/or wireless access points at a plurality of locations of a retail entity. A network service provider may install the plurality of wired and/or wireless access points. According to one embodiment, the network service provider may provide network services, such as Internet access, through each of the wired and/or wireless access points. In several embodiments, the wired and/or wireless access points are arranged at known geographic locations and may provide content, advertising, and/or promotions based on the geographic location of the wired and/or wireless access point or a geographic location of a mobile user.

The network service provider may receive a payment from a first carrier entity for installation and/or operation of the one or more of wireless access points at the locations of the retail entity. Thus, instead of requiring the network service provider to recover installation and/or maintenance costs from usage of the wired and/or wireless access points over a lengthy amount of time, the network service provider may receive an up-front payment from one or more carrier entities. Since carrier entities already have a large installed base of subscribers, each carrier entity may be in a better position to recover the installation and/or maintenance costs through subscriber billing and usage. This provides an improved business method and/or system for installing and maintaining wired and/or wireless access points at various distributed locations.

The network service provider may also receive a payment from the retail entity. The payment from the retail entity may be in addition to the payment from the carrier entity. For example, the retail entity may desire to offer various services through the wired and/or wireless access points. The retail entity may desire to use other elements supported by a network operated by the network service provider, such as various back office devices.

The retail entity may receive a payment from the carrier entity for the carrier entity to offer services at a subset of or all of the locations of the retail entity. Alternatively, the carrier entity may receive payment from the retail entity for offering services at a subset of or all of the locations of the retail entity, since the offered services of the carrier entity at locations of the retail entity may provide the retail entity with increased customer visitation, e.g., including opportunities to sell more goods and/or services to subscribers of the carrier entity.

In one embodiment, the network service provider may receive and/or store information associated with the payment from the first carrier entity in a computer system. The first carrier entity may offer network service to various of its subscribers through the one or more wired and/or wireless access points. The first carrier entity may be telephone service provider (e.g., a local telephone service, a cellular telephone service, or a long distance telephone service, among others), or the first carrier entity may be a television service provider (e.g., a cable television, or a satellite television service, among others), and/or an internet service provider. Other types of entities may also be considered.

A computer system operated by the first carrier entity may provide invoices to its subscribers. The invoices may indicate a charge for wireless access at any or a subset of the plurality locations of the retail entity. For example, the carrier entity may already provide invoices to its subscribers for certain pre-existing services such as local or long-distance telephone service and/or internet services. The carrier entity may add a charge for wired and/or wireless access at a subset or all of the retail entity locations to these pre-existing service charges. Alternatively, the carrier entity may add the retail entity network access as a "free" service to its customers, in the hopes of enticing more customers to sign up or switch to the respective carrier.

In various embodiments, each subscriber of the first carrier entity may use a portable computing device to communicate with a wired and/or wireless access point of the one or more wired and/or wireless access points. Alternatively, various ones of the retail entity locations may provide computers at the location for usage (e.g., locked down to prevent theft). Thus, subscribers of the first carrier entity may use these provided computers. The network service provider may determine if a user is a subscriber of the first carrier entity and provide network access to the portable computing device of the user if the user is determined to be a subscriber. A username and password combination may be used in determining if the subscriber is to be authenticated for access of service.

If the user is not a subscriber of the first carrier entity, the first carrier entity and/or the network service provider may request payment from the user. The user may provide a payment to the first carrier entity, the retail entity, and/or the network service provider by submitting credit card information, among other types of information. In one embodiment, a user who is not a subscriber of the carrier may use the network by paying a small fee to the retail entity, e.g., a fee added to his/her bill for a certain time period of network usage. The amount paid by the user and/or the amount of time for network access may depend on the amount of goods or services purchased by the user.

In several embodiments, the network service provider may receive a payment from each of multiple carrier entities for installation and/or operation of the one or more of wired and/or wireless access points at the plurality of locations of the retail entity. The network service provider may provide a virtual point of presence for each of the multiple carrier entities at a subset or all of the plurality of locations of the retail entity. In various embodiments, a single physical point of presence provided by the network service provider may accommodate subscribers of each of the multiple carrier entities by providing a virtual point of presence each of the multiple carrier entities through the physical point of presence.

Each portable computing device of each subscriber may store identification (ID) information which may uniquely indicate a carrier entity of which the subscriber subscribes. The ID information may take various forms, such as a System ID (SID), MAC ID, or other identification which may be used to identify a carrier entity to which the subscriber has subscribed. As used herein, the SID may include an SSID (Service Set ID), a BSSID (Basic Service Set ID), or an ESSID (Extended Service Set ID), among others. When the portable computing device is within a vicinity of a wireless access point, the portable computing device may provide the ID information to the wireless access point.

In various embodiments, each of the wireless access points is operable to "listen for" or detect ID information, e.g., System IDs, associated with numerous different carrier entities. In several embodiments, each of the access points may be operable to broadcast requests for identification information, e.g., broadcast System IDs to the portable computing devices, wherein the portable computing devices may respond to this broadcast by providing the identification information. Broadcasts by wireless access points may be considered "beacons."

In several embodiments, a wireless access point may include or access software which is executable to provide wireless access point functionality for each of the multiple carrier entities. The software may implement a "super access point" which maintains associations between the multiple carrier entities and a corresponding plurality of SIDs, such as MAC IDs, SSIDs, ESSIDs, etc. The wireless access point may be capable of broadcasting and/or recognizing any of the plurality of SIDS, behaving appropriately for different SIDS that are received from portable computing devices of users, and providing network services to each subscriber through that subscribers carrier virtual point of presence. A wireless access point may be operable to appear as any one of a plurality of different carrier entities, meaning that a single wireless access point may "pretend to be" or behave as a wireless access point dedicated to a particular carrier entity for each of a plurality of different carrier entities.

In various embodiments, a wireless access point provides a plurality of virtual wireless access points, where a virtual wireless access point may include wireless access point functionality implemented in software that appears as a physical AP to a portable computing device. The plurality of virtual wireless access points or "software" wireless access points may be implemented on one or more physical wireless access points, e.g., on a common set of physical wireless access points. For example, each physical wireless access point may implement a plurality of virtual wireless access points. Each instance of a virtual wireless access point executes a complete IEEE 802.11 protocol stack, and may be indistinguishable from a hardware wireless access point to any wireless network client(s). Each virtual wireless access point or "software" wireless access point may include its own ESSID or SSID, among other IEEE 802.11 IDs, and may be uniquely associated with a carrier virtual point of presence.

In several embodiments, a network management device (NMD) may be used to provide access control of services through a wireless access point. Each of the plurality of different carrier entities may desire to provide different means of access control for its subscribers. In various embodiments, software and/or information that may enable an NMD to accommodate or service subscribers of a plurality of different carrier entities. The software and/or information may implement one or more virtual points of presence. In one example, instead of using a separate NMD for each carrier entity supported at a location, the NMD may be operable to appear as a point of presence to any one of a plurality of different carrier entity at the location, meaning that a single NMD may "pretend to be" or behave as a point of presence dedicated to a particular carrier entity for each of a plurality of different carrier entities. Each virtual point of presence for each carrier entity may be considered a carrier virtual point of presence.

In various embodiments, each carrier virtual point of presence may include a carrier-specific sign-in method. According to one embodiment, the carrier-specific sign-in method may include a set of web pages available to a user before he or she is authenticated for further service by a carrier entity. The web pages may include various information about the carrier entity, maps, information about a surrounding area, an advertisement, a promotion, and/or sign-in information, among others. In one embodiment, the carrier-specific sign-in method may include a roaming sign-in method. For example, the carrier entity may allow subscribers of another carrier entity to use services of the carrier entity at various locations of the retail entity.

In several embodiments, the wireless service may provide wireless access to employees of the retail entity. This access may include access of one or more back office devices (e.g., cash registers, credit card processing devices, etc.). For instance, an employee may use a wireless device to place orders of customers.

Each of the APs may be coupled to an NMD through a local area network (LAN). Various portions of the LAN may include various "wired" and/or wireless elements. In various embodiments, the LAN supports a VLAN (Virtual LAN) protocol, such as IEEE 802.1(q). In order to partition the network, the network system may maintain a binding between the ESSID or SSID and VLAN IDs/tags or equivalents. This may allow a common LAN (using VLAN-capable devices) to supply a secured "virtual LAN" to each carrier virtual point of presence of the NMD. In various embodiments, quality of service (QoS) (e.g., IEEE 802.1(p)) may be used to provide service differentiation. According to one embodiment, a VLAN and a QoS may be used in tandem. This may allow the network service provider to provide service level agreements to various users, including both subscriber of the carrier entities and, for example, employees of the retail entity. In several embodiments, one or more back office devices of the retail entity may use a network provided by the network service provider. Moreover, traffic from the back office devices may be separated from network traffic from subscribers of one or more carrier entities. The network architecture described herein may scale to support hundreds of these carrier entities, and thousands of simultaneous users and/or subscribers in each location.

BRIEF DESCRIPTION OF THE DRAWINGS

Other objects and advantages of the invention will become apparent upon reading the following detailed description and upon reference to the accompanying drawings in which.

Figure 1:
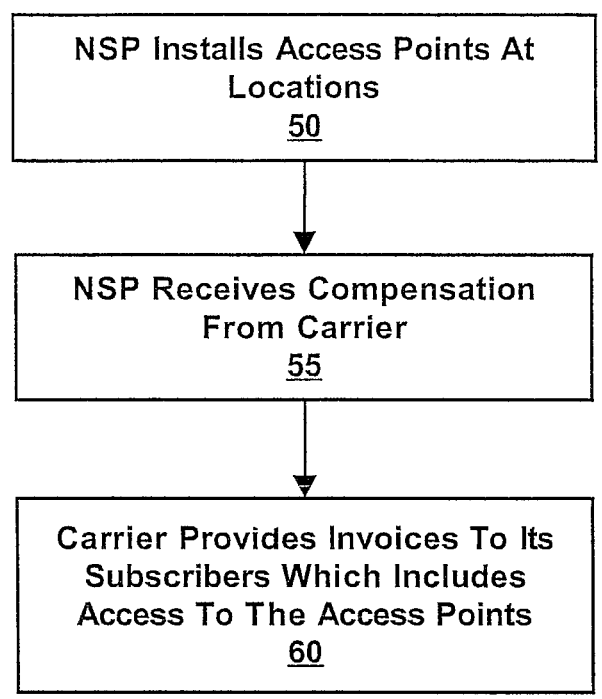
FIG. 1 is a flowchart diagram illustrating a method for providing network services, according to various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

U.S. Pat. No. 5,835,061, titled "Method and Apparatus for Geographic-Based Communications Service", whose inventor is Brett B. Stewart, is hereby incorporated by reference in its entirety as though fully and completely set forth herein.

U.S. Pat. No. 5,969,678, titled "System for Hybrid Wired and Wireless Geographic-Based Communications Service", whose inventor is Brett B. Stewart, is hereby incorporated by reference in its entirety as though fully and completely set forth herein.

U.S. patent application Ser. No. 09/433,817 titled "Geographic Based Communications Service" and filed on Nov. 3, 1999, whose inventors are Brett B. Stewart and James Thompson, is hereby incorporated by reference in its entirety as though fully and completely set forth herein.

U.S. patent application Ser. No. 09/433,818 titled "A Network Communications Service with an Improved Subscriber Model Using Digital Certificates" and filed on Nov. 3, 1999, whose inventors are Brett B. Stewart and James Thompson, is hereby incorporated by reference in its entirety as though fully and completely set forth herein.

U.S. Pat. No. 6,732,176, titled "Distributed Network Communication System Which Enables Multiple Network Providers To Use A Common Distributed Network Infrastructure", whose inventors are Brett B. Stewart, James Thompson, and Kathleen E. McClelland, is hereby incorporated by reference in its entirety as though fully and completely set forth herein.

U.S. patent application Ser. No. 09/551,309 titled "System and Method for Managing User Demographic Information Using Digital Certificates" and filed on Apr. 18, 2000, whose inventors are Brett B. Stewart and James Thompson, is hereby incorporated by reference in its entirety as though fully and completely set forth herein.

U.S. patent application Ser. No. 09/556,380 titled "System and Method for Operating a Reverse Firewall" and filed on Apr. 25, 2000, whose inventors are Brett B. Stewart and James W. Thompson, is hereby incorporated by reference in its entirety as though fully and completely set forth herein.

U.S. patent application Ser. No. 09/638,282 titled "System and Method for Distributing Offer Rules in a Communication Service System" and filed on Aug. 14, 2000, whose inventors are Brett B. Stewart and James Thompson, is hereby incorporated by reference in its entirety as though fully and completely set forth herein.

U.S. patent application Ser. No. 09/707,729 titled "System and Method for Providing Different Access Levels in a Communication Service System" and filed on Nov. 11, 2000, whose inventors are Brett B. Stewart, James Thompson and Kathleen E. McClelland, is hereby incorporated by reference in its entirety as though fully and completely set forth herein.

U.S. patent application Ser. No. 09/767,374 titled "Distributed network communication system which allows multiple wireless service providers to share a common network infrastructure" and filed on Jan. 22, 2001, whose inventors are James Thompson, Kathleen E. McClelland, and Brett B. Stewart, is hereby incorporated by reference in its entirety as though fully and completely set forth herein.

U.S. Provisional Patent Application Ser. No. 60/383,827 titled "Roaming" and filed on May 29, 2002, whose inventors are James D. Keeler and Matthew M. Krenzer, is hereby incorporated by reference in its entirety as though fully and completely set forth herein.

U.S. patent application Ser. No. 10/341,761 titled "Authorization And Authentication Of User Access To A Distributed Network Communication System With Roaming Features" and filed on Jan. 14, 2003, whose inventors are James D. Keeler and Matthew M. Krenzer, is hereby incorporated by reference in its entirety as though fully and completely set forth herein.

U.S. patent application Ser. No. 10/387,337 titled "System And Method For User Access To A Distributed Network Communication System Using Persistent Identification Of Subscribers" and filed on Mar. 11, 2003, whose inventors are James D. Keeler, Ian M. Fink, and Matthew M. Krenzer, is hereby incorporated by reference in its entirety as though fully and completely set forth herein.

U.S. Provisional Patent Application Ser. No. 60/454,212 titled "Chit Code System and Method for Authentication and Access Control" and filed on Mar. 11, 2003, whose inventors are Ian M. Fink and James D. Keeler, is hereby incorporated by reference in its entirety as though fully and completely set forth herein.

U.S. patent application Ser. No. 10/442,526 titled "User Fraud Detection and Prevention of Access to a Distributed Network Communication System" and filed on May 21, 2003, whose inventors are Ian M. Fink and James D. Keeler, is hereby incorporated by reference in its entirety as though fully and completely set forth herein.

U.S. patent application Ser. No. 10/797,430 titled "Method and System for Providing Network Access and Services Using Access Codes" and filed on Mar. 10, 2004, whose inventor is Ian M. Fink, is hereby incorporated by reference in its entirety as though fully and completely set forth herein.

FIG. 1—Set-Up

FIG. 1 illustrates a method for providing network services, according to various embodiments. It is noted that in various embodiments one or more of the method elements may be performed concurrently, in a different order, or be omitted. Additional elements may be performed as desired.

At 50, a network service provider (NSP) may install one or more wired and/or wireless access points (APs) 120 at one or more locations, typically a plurality of locations, of a retail entity. Each access point (AP) 120 may be coupled to a network, such as a network 130 described below. The retail entity may use services provided by APs 120 and/or network 130. For example, back office devices, such as cash registers and/or credit card processing devices, may be coupled to network 130 and use services provided by network 130.

In various embodiments, the NSP may receive compensation (e.g., a payment) from a carrier, at 55. As used herein, the term "carrier" or "carrier entity" is intended to include any of various entities involved with the transport of voice, audio, video, and/or data, including a telephone company, a long distance service provider, a cellular telephone company, a satellite telephone company, a voice over Internet protocol (VoIP) telephone company, and/or a cable television provider, among others. The compensation may be received as a lump sum or received over a period of time (e.g., six months, one year, 5 years, etc.). Thus, the NSP may receive compensation for installing, operating, and/or maintaining APs 120 and/or other networking equipment.

In several embodiments, the NSP may also receive compensation (e.g., a payment) from the retail entity. For example, the retail entity may desire to offer various services through APs 120. The retail entity may desire to use one or more devices supported by network 130, such as various back office devices described above. According to one embodiment, the NSP may receive compensation from the retail entity in addition to compensation from the carrier entity.

In one embodiment, the retail entity may receive a payment from the carrier entity for the carrier entity to offer services at a subset of or all of the locations of the retail entity. Thus, in this embodiment, the retail entity may pay both the NSP and the carrier entity.

According to another embodiment, the carrier entity may receive payment from the retail entity for offering services at a subset of or all of the locations of the retail entity. For example, the offered services of the carrier entity at locations of the retail entity may provide the retail entity with opportunities to attract more customers, e.g., to sell goods and/or services to subscribers of the carrier entity. The retail entity may also provide a payment to the NSP, in addition to the payment from the carrier entity to the NSP.

In some embodiments, the NSP may store information associated with various compensations in a computer system. In various examples, the NSP may store a record of a payment in a database (e.g., an accounting database); the NSP may receive a payment from the carrier and/or the retail entity via electronic transfer of funds; or the NSP may receive a check from the carrier and/or the retail entity. The NSP may deposit the check in a bank account, and a bank may electronically update the bank account to account for the check deposit.

The carrier may charge its customers for use of the APs 120 at various retail entities. In various embodiments, the carrier may provide statements, invoices, and/or bills on a periodic basis to its subscribers, at 60. In some embodiments, subscribers may be considered customers of the carrier, wherein the subscribers of the carrier have a pre-existing billing and/or contractual relationship with the carrier. For instance, a carrier such as a telephone company may provide monthly invoices to users of its telephone service. The carrier may bundle access and/or services provided by APs 120 with a customer and/or subscriber bill. Services provided by APs 120 may be itemized on a bill. Bills for services provided by APs 120 may be included in bills for other services, such as long distance telephone service, local telephone service, cable television service, and/or broadband service, among others.

The carrier may also provide access and/or services of APs 120 as an amenity or value-added service (e.g., free service) for being a subscriber of the carrier. Thus, access and/or services of APs 120 may be provided for being a subscriber of a long distance service or cellular telephone provider, among others. Alternatively, access and/or services of APs 120 may be provided to bank account holders who have access to online bill paying and/or free checking, among others.

In several embodiments, a customer of the carrier may be considered a walk-up customer, where the customer may provide compensation (e.g., a payment) to the carrier in an ad hoc fashion. In some embodiments, the carrier may share the compensation from the walk-up customer. For example, the carrier may share the compensation with the retail entity and/or the network provider. If other carriers are available at the location of the walk-up customer, the carrier may share the compensation with various of the other carriers available at the location of the walk-up customer.

In some embodiments, a walk-up customer may become a subscriber of one or more services of the carrier. For example, the network may provide a web page (such as a forced first page (FFP)) that provides information on how a walk-up customer may sign up to become a subscriber of the carrier. The walk-up customer may register or sign-up for a monthly or month-to-month subscription, among other types of subscriptions, with the carrier. The carrier may share revenue from the subscription with the retail entity and/or the network service provider. If other carriers are available at the location of the walk-up customer, the carrier may share the revenue with various of the other carriers available at the location of the walk-up customer.

In various embodiments, the NSP may (also) receive compensation from a carrier over a period of usage, such as a perpetual period of time, for ongoing management and maintenance of the network. This compensation may be a periodic fee. For example, the NSP may receive monthly payments from the carrier for allowing one or more customers and/or subscribers of the carrier to access APs 120. The retail entity may also receive ongoing compensation from a carrier for allowing one or more customers and/or subscribers of the carrier to access APs 120. For example, the retail entity may receive monthly payments from the carrier for allowing one or more customers and/or subscribers of the carrier to access APs 120.

Figure 2:
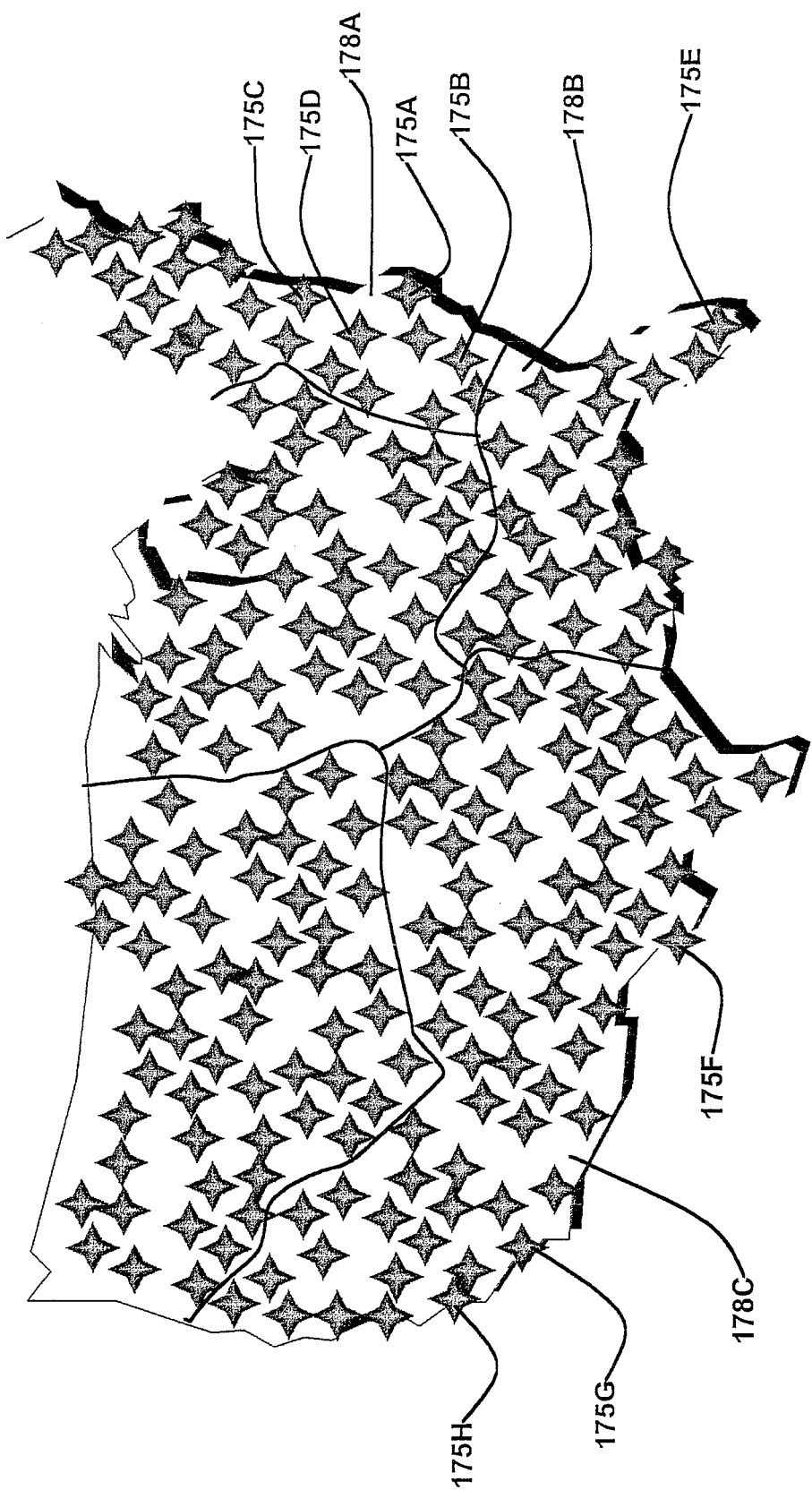
FIG. 2 is a diagram illustrating a plurality of locations of a retail entity, according to various embodiments.

FIG. 2—Locations of a Retail Entity

In various examples, a retail entity may comprise: a chain fast-food of restaurants; a chain of hotels; a chain of fueling stations (e.g., gas stations, truck stops, etc.); a chain of convenience stores; a chain of discount stores or "super centers" (e.g., Wal-Mart®, K-Mart®, etc.); and/or a chain of coffee shops; among other types of retail entities. A retail entity may also comprise various combinations of different retail entities who have joined together to offer network services, perhaps to provide joint branding or economies of scale.

In various embodiments, a retail entity may include a plurality of locations in one or more geographic regions. For example, the retail entity may include locations 175A-175D in a geographic region 178A as illustrated in FIG. 2. A geographic region may be of any size and/or shape. In some embodiments, the retail entity may own each business location, such as locations 175A-175H. In various embodiments, a portion of the business locations may be franchises. For instance, the retail entity may include franchise locations in geographic regions 178B-178C.

FIG. 3—A Network Communications System

FIGS. 3A-3G illustrate a distributed network communication system (NCS) 100, according to various embodiments. NCS 100 may include one or more APs 120, wherein the APs 120 may be installed in various retail entity locations as described above. The wireless APs 120A-120B may communicate with a portable computing device (PCD) 110 in a wireless fashion, while the wired APs 120C-120D may communicate with PCD 110 in a wired fashion. Each wireless access point (AP) 120 may include a wireless transceiver and may operate according to various wireless standards, such as wireless Ethernet (IEEE 802.11), IEEE 802.16, Bluetooth, General Packet Radio Service (GPRS), CDMA (code division multiple access), TDMA (time division multiple access), FDMA (frequency division multiple access), ultra wide band, digital, and/or infrared communication technologies, among others.

Each of the APs 120 may be coupled to a network 130A. Network 130A may be coupled to a network management device (NMD) 105. NMD 105 may be coupled to network 130B. WANs 107A-107B, corporate networks 101A-101B, and/or Internet 170 may be coupled to network 130B. In various embodiments, NMD 105 may provide authentication and/or access control from one or more PCDs 110 coupled to network 130A through an AP 120 to the various WANs 107, local area networks (LANs), and corporate networks 101, including the Internet 170. Thus, NMD 105 may be coupled to a PSTN, e.g., Ethernet cable and DSL; a cable (television) based network; a satellite-based system; a fiber based network; among others.

Network 130 (including 130A-130G) may include a wired network, a wireless network or a combination of wired and wireless networks. Network 130 may include and/or be coupled to other types of communications networks, (e.g., other than the Internet) such as a public switched telephone network (PSTN), where APs 120 and/or PCD 110 may send and receive information from/to the PSTN or other communication networks. Network 130 may also be coupled to a wide area network (WAN), such as a proprietary WAN. Network 130 thus may be, or be coupled to, any of various wide area networks (WANs), local area networks (LANs), corporate networks, including the Internet.

Network 130 (including 130A-130G) may include one or more wireless networks, e.g., based on IEEE 802.11 and/or IEEE 802.16. For instance, one or more wired and/or wireless APs 120 may be coupled to network 130A in a wireless fashion. Network 130A may include one or more DSL (digital subscriber line) and/or cable (e.g., cable television) networks and/or infrastructures. For example, network 130A may include one or more of: cable modems, cable modem termination systems (CMTSs), satellite modems, DSL modems, digital subscriber line access multiplexers (DSLAMs), broadband remote access servers (BRASs), and/or metropolitan area networks (MANs), among others. Network 130 may form part of the Internet, or may couple to other networks, e.g., other local or wide area networks, such as the Internet 170. Thus, APs 120 in various retail entity locations may be coupled together using a PSTN, e.g., Ethernet cable and DSL; a cable (television) based network; a satellite-based system; and/or a fiber based network; among others.

In various embodiments, access to these networks may include any "services" these networks may provide. For example, these services may include: email, world wide web, file transfer, printing, file sharing, file system sharing, remote file system, network file system (NFS), news, multicast, netbios, encryption, domain name service (DNS), routing, tunneling, chat such as Internet Remote Chat or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, or video, among others.

NCS 100 may include one or more content providers 160. In one embodiment, content provider 160A may be coupled to network 130A. According to one embodiment, content provider 160B may be coupled to network 130B, e.g., through Internet 170. In various embodiments, content provider 160 may provide information such as audio, video, text, pictures, and/or maps among others. For example, the information could be based on a geographic location of a PCD 110 and/or an AP 120. For instance, a location of AP 120 may be provided to content provider 160, and content provider 160 may provide geographic based advertising; geographic based travel information; or display a map to PCD 110 which shows an area in the vicinity of PCD 110. Some or all of the content may be pre-distributed to a local cache device 162 (such as a computer hard drive or other memory media) to facilitate faster local access to said content and to minimize delays and/or costs of transmitting said content through network 130B.

The content may be based on the retail entity and current promotions of the retail entity. For example, the content may be entertainment type content to entice customers into the retail entity locations. For example, for a fast food restaurant, such as a McDonalds®, content may be provided that is geared to children, such as games based on current McDonalds® promotions or themes, etc. In one embodiment, network access to this type of enticement content may be given freely to purchasing customers to entice them to visit the retail location. This type of network content may be provided in lieu of traditional "plastic toys" or other items routinely given out to children in these restaurants.

In one embodiment, content provider 160 may provide content that may be used by the business itself, e.g., content to train employees of the retail entity or provide necessary business information. According to one embodiment, content provider 160 may provide content that may be used to train employees of a carrier. In several embodiments, NMD 105 may include content provider 160 or the content and functionality of content provider 160. A portion or all of said content may be cached on a local cache device 162.

NCS 100 may include a management information base (MIB) 150. MIB 150 may be coupled to network 130A. MIB 150 may be a mechanism, such as a memory, which may allow the persistent storage and management of information needed by network 130A to operate. In one embodiment, MIB 150 may store a data structure, such as a table comprising a list of identification information and a corresponding list of the plurality of possible networks and/or services. The data structure may also store access information, which may include associated methods for providing data to/from the respective plurality of possible networks and/or services. The access information may include access level and/or privilege level information. The data structure may include a table having a plurality of tuples, with each tuple having the identification information. According to one embodiment, the data structures which store this information may be included in each of the APs 120, or may be provided in various other locations.

MIB 150 may store other information, such as a directory of all the elements (e.g., access points, computing devices, etc) in the network, the topology of the network, characteristics of individual network elements, characteristics of connection links, performance and trend statistics, and any information which is of interest in the operation of network 130A. For example, MIB 150 may store the precise longitude, latitude, altitude and other geographic information pinpointing the location of each access point.

In several embodiments, NMD 105 may be a computer system operable to include MIB 150, network 130A, various networking equipment, and/or one or more APs 120, among others.

A user operating PCD 110 may communicate with one of the APs 120 to gain access to a network and its services, such as Internet 170. PCD 110 may have a wireless communication device, e.g., a wireless Ethernet card, for communicating with one or more of the wireless APs 120. PCD 110 may instead have a wired communication device, e.g., an Ethernet card, for communicating with one or more of the wired APs 120.

In several embodiments, PCD 110 may be any of various types of devices, including a computer system, such as a portable computer, a personal digital assistant (PDA), an Internet appliance, a communications device, or other wired or wireless device. PCD 110 may include various wireless or wired communication devices, such as a wireless Ethernet card, paging logic, RF (radio frequency) communication logic, a wired Ethernet card, a modem, a DSL device, an ISDN device, an ATM (asynchronous transfer mode) device, a parallel or serial port bus interface, or other type of communication device.

In various embodiments, PCD 110 may include a memory medium which stores identification information. The identification information may be a System ID (an IEEE 802.11 System ID), a processor or CPU ID, a Media Access Control (MAC) ID of a wireless or wired Ethernet device comprised in the PCD 110, or other type of information that identifies PCD 110. The identification information may be included in a digital certificate (e.g., an X.509 certificate), which may be stored in a web browser, in a client software, or in a memory medium of PCD 110.

With wireless APs 120, the wireless communication may be accomplished in a number of ways. In one embodiment, PCD 110 and wireless APs 120 are equipped with appropriate transmitters and receivers compatible in power and frequency range (e.g., 900 MHz, 2.4 GHz, 3.6 GHz, 5 GHz, among others) to establish a wireless communication link. Wireless communication may also be accomplished through cellular, digital, or infrared communication technologies, among others. To provide user identification and/or ensure security, PCD 110 and/or wireless APs 120 may use any of various security systems and/or methods.

With wired APs 120, the wired connection may be accomplished through a variety of different ports, connectors, and/or transmission mediums. For example, PCD 110 may be connected through an Ethernet, universal serial bus (USB), FireWire (IEEE 1394), serial, or parallel transmission cables, among others. PCD 110 may also include various communication devices for connecting to one of the wired APs 120, such as wired Ethernet cards, modems, DSL adapters, ATM adapters, IDSN devices, or other communication devices. In one example, a hotel, such as location 175A, may have Ethernet connections in the restaurants, shops, meeting rooms, and/or guest rooms. In a second example, a fast-food restaurant and/or a coffee shop, such as location 175B, may have both wireless and wired connections for mobile users. A user may connect to a wired AP 120C through the use of a laptop computer (PCD 110), an Ethernet network card, and a network cable. This connection may have the same impact as a connection made to a wireless AP 120B. In other words, a user using a wired PCD 110 may be able to use various network infrastructures in the same manner as a user using a wireless PCD 110.

In various embodiments, NCS 100 may be geographic-based. In other words, the NCS 100 may provide information and/or services to a PCD 110 of a user based at least partly on the geographic location of the PCD 110, e.g., as indicated by APs 120 or as indicated by geographic information (e.g., GPS information, fast-food restaurant or coffee shop location, room identification or number, among others) provided from PCD 110. In one embodiment, APs 120 are arranged at known geographic locations and may provide geographic location information regarding the geographic location of the user or PCD 110. According to one embodiment, PCD 110 may provide geographic location information of the PCD 110 through an AP 120 to network 130A. For example, the PCD 110 may include GPS (Global Positioning System) equipment enabling PCD 110 to provide its geographic location through the AP 120 to network 130A.

Figure 3A:
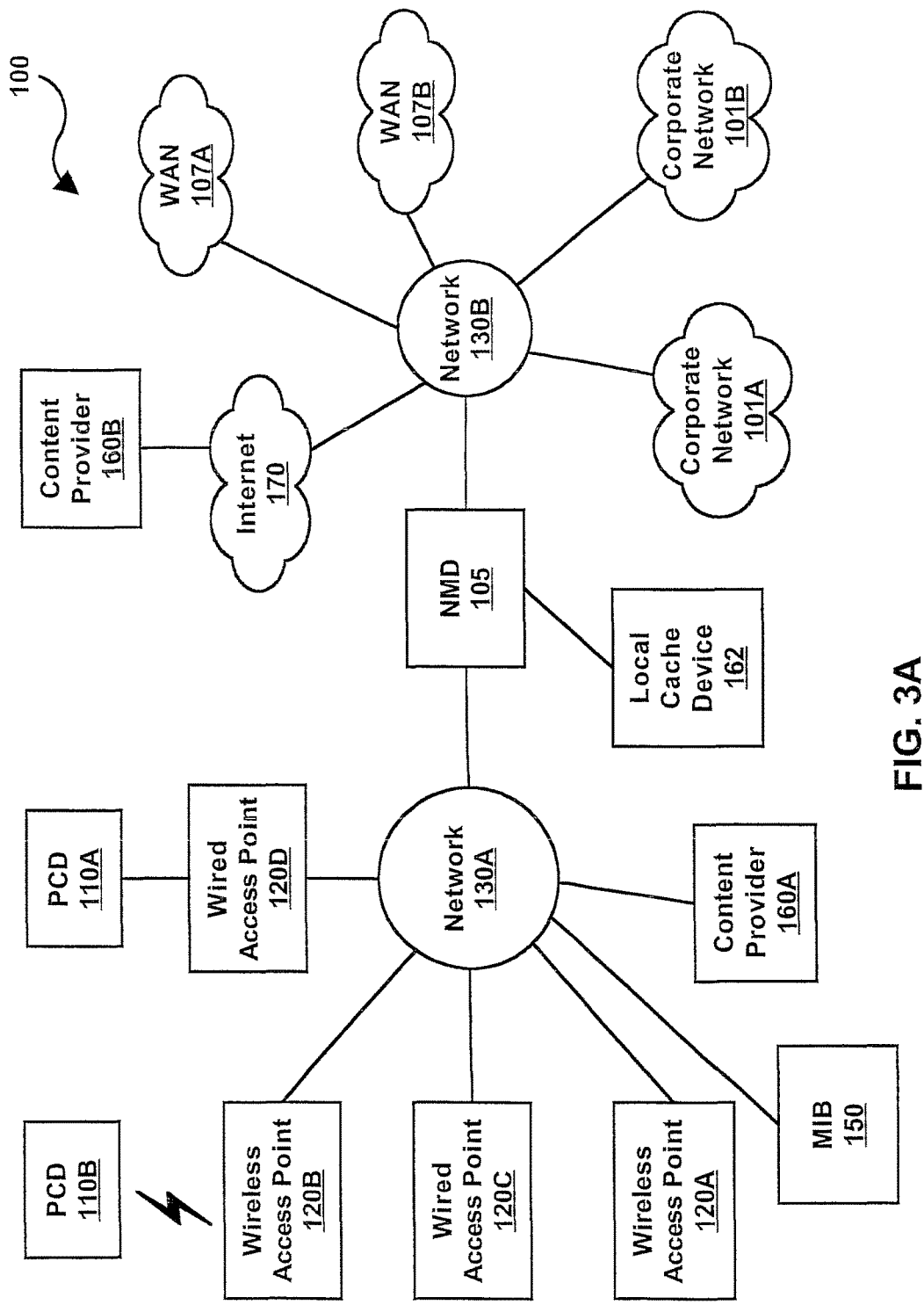
FIG. 3A is block diagram of a network communication system, according to various embodiments.
Figure 3B:
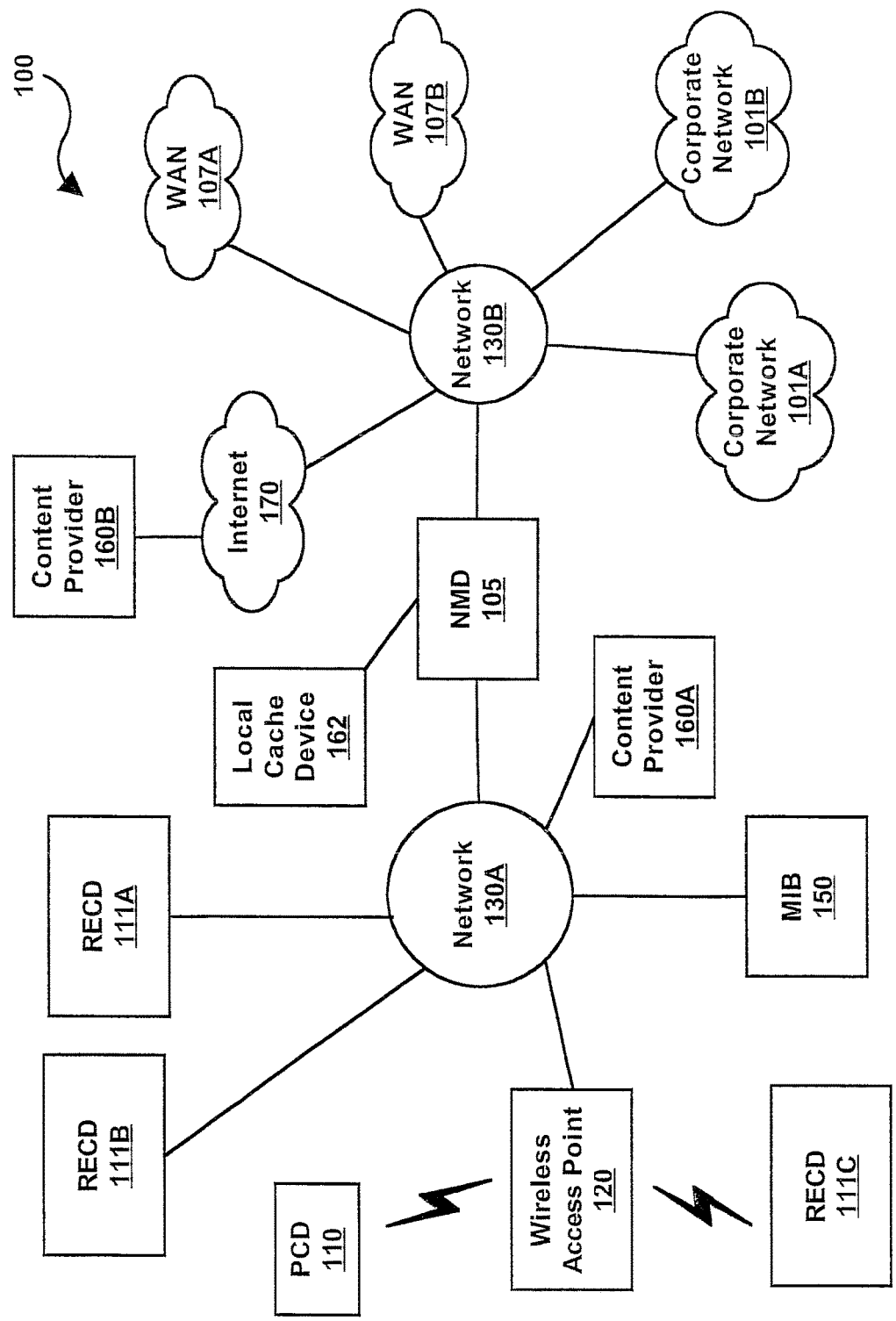
FIG. 3B is block diagram of a network communication system, according to various embodiments.

In some embodiments, a retail entity computing device (RECD) 111 may be coupled to network 130A. Retail entity computing device (RECDs) 111A-111B may be coupled to network 130A in a wired fashion while RECD 111C may be coupled to network 130A in a wireless fashion by wireless AP 120, as shown in FIG. 3B.

A retail entity may provide RECDs 111 at various locations of the retail entity. RECDs 111 may be used by customers of the retail entity to access content and/or network services offered at the various locations. In several embodiments, the retail entity may distribute access codes, and the access codes may be used to authenticate a user for service. For example, an access code may be used to authenticate a user for access to Internet 170. The RECDs 111 may be "locked down" to prevent theft.

The retail entity may distribute access codes to access content through RECDs 111. For example, a customer of the retail entity may receive an access code and use the access code with RECD 111B to access content from content provider 160A and/or 160B. In various examples, the content may include audio, video, maps, pictures, and/or text, among others. For instance, the content may include a movie trailer, a music video, and/or a computer-implemented game, web pages, graphics, digital magazines, among others. Some or all of said content may be cached on a local file server 162. Said content cache may be updated, replaced, or added to based on various factors including, but not limited to, the date of the content (e.g. digital magazines and/or digital newspapers may be updated once/day or once/week), the local demographics or local area attractions, size of the data, available bandwidth for download, or other scheduled mechanism for updating the cached content.

In several embodiments, access codes to content may be provided to customers with a purchase of goods and/or services. For example, a customer may receive an access code to download a computer-implemented game. The computer-implemented game may be downloaded to PCD 110, for instance. The access code to download a computer-implemented game may be distributed instead of a toy or trinket that may have accompanied a purchase of a meal. The computer-implemented game may include one or more digital rights management schemes. For instance, a digital rights management scheme may provide protection against further distribution of the computer-implemented game, e.g., not allowing distribution of the computer-implemented game to another computing device after it is downloaded. A digital rights management scheme may allow the computer-implemented game to only be played at a location of the retail entity.

Figure 3C:
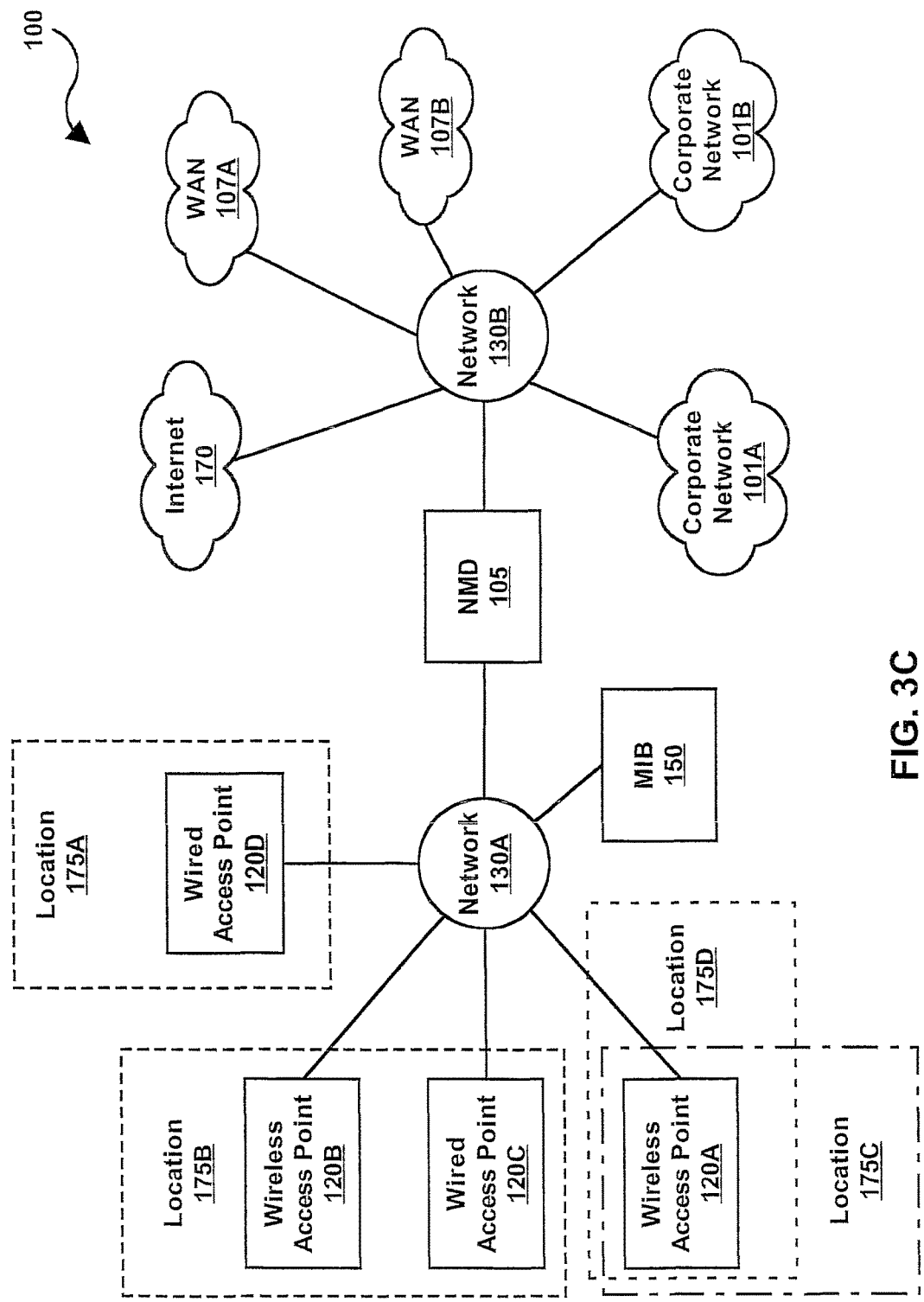
FIG. 3C is block diagram of a network communication system, according to various embodiments.

In several embodiments, NMD 105 may service a single location. In various embodiments, NMD 105 may service a plurality of locations 175, as shown in FIG. 3C. For instance, each of the venues 175A-175D may include a portion of NCS 100. In one embodiment, a plurality of venues, such as venues 175C-175D, may include a physical portion of NCS 100 where the physical portion, such as wireless AP 120A, is common to both venues. The physical portion of NCS 100 may appear as more than one portion in a virtual fashion with the use of virtual access points as further described below.

Figure 3D:
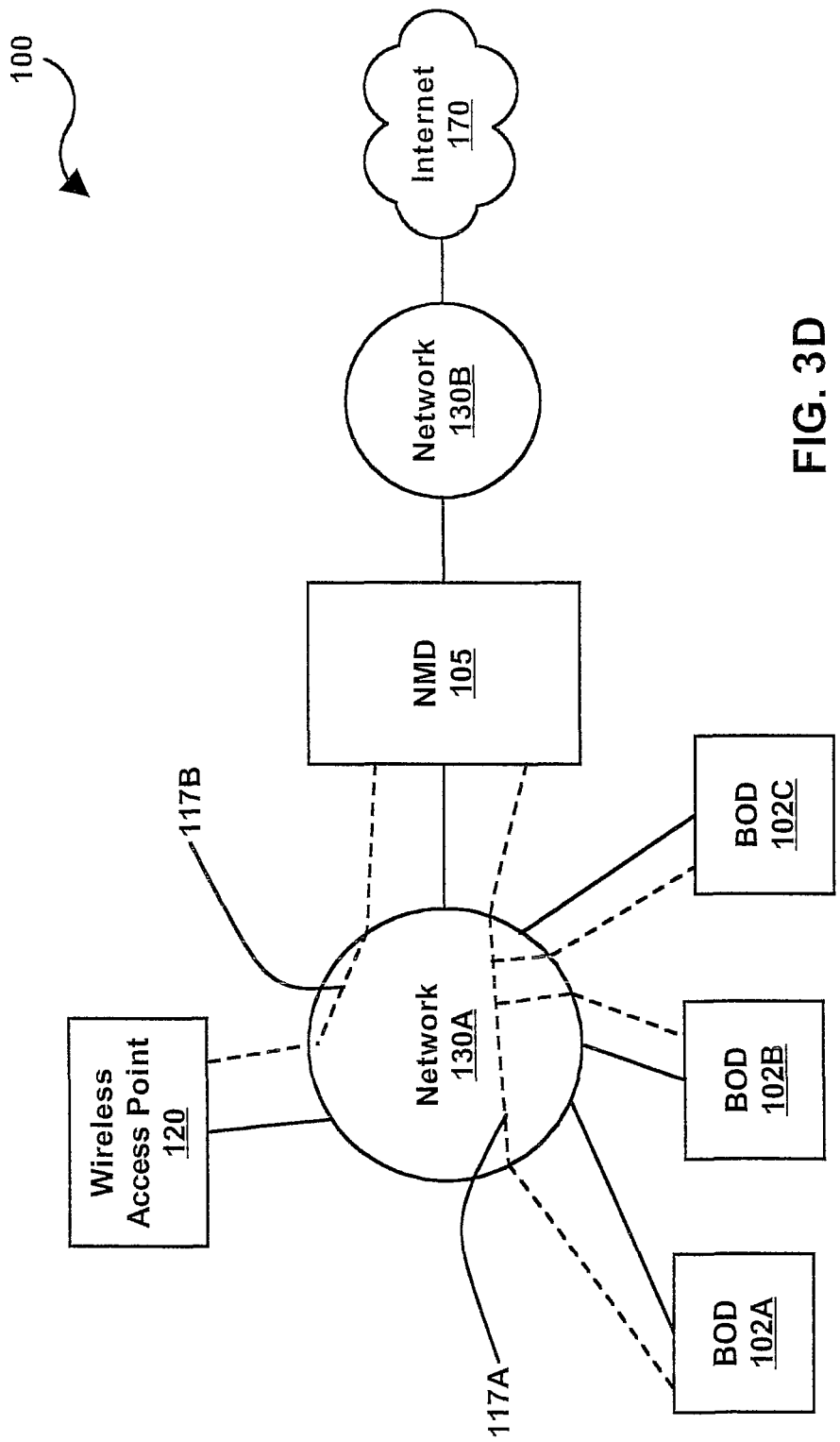
FIG. 3D is block diagram of a network communication system, according to various embodiments.

In various embodiments, NCS 100 may include and/or use various virtual local area networks (VLANs) 117, as shown in FIG. 3D. In several embodiments, a back office device (BOD) 102 may be coupled to network 130A. For example, a BOD 102 may include a cash register, or a BOD 102 may include point of sale (POS) terminal with a credit card reading mechanism. The POS terminal may be configured to contact a clearinghouse through a network to debit one or more credit or debit card accounts. The POS terminal may include other mechanisms to identify a customer and/or customer account information. The POS terminal may include a smart card reader. For instance, the smart card reader may be used to read bank account information from a smart card. The POS terminal may include a radio frequency identification (RFID) reader. For instance, an RFID may indicate account information of a customer.

In several embodiments, information may be communicated to and from BOD 102 through network 130A using a VLAN 117A. For example, BODs 102A-102C may communicate with NMD 105 through VLAN 117A. For instance, it may be desirable to separate communications from BODs 102A-102C from other network elements, such as wireless AP 120. According to one embodiment, wireless AP 120 may use VLAN 117B to communicate with NMD 105. Using VLANs 117A-117B, NMD 105 and network 130A may allow any information communicated to and/or from a BOD 102 to not be available through wireless AP 120. This may effectively create or produce private and public portions of network 130A.

In several embodiments, network 130 may support bandwidth shaping or traffic shaping. According to one embodiment, a data rate or packet rate may be reserved for one or more computer systems at location 175. For example, a BOD 102 may be able to use a data rate 728 kilobits per second (kbps) to transmit information to Internet 170 while a PCD 110 may only be able to use 128 kbps to transmit information to Internet 170. In one embodiment, traffic shaping may "deburst" or smooth traffic flows. For example, without traffic shaping, packets traversing network 130 may be: ten packets in a first second, 0 packets in a second second, and twenty packets in a third second. With traffic shaping, the thirty packets may traverse network 130 at ten packets per second, and more than three second may transpire before all thirty packets traverse network 130.

In various embodiments, network 130 may support IEEE 802.1p, which provides various quality of service (QoS) or class of service (CoS). This may enable network 130 to enforce certain predefined quality of service metrics to any given port or virtual port included within network 130. For instance, using QoS, network 130 may be operable to prioritize traffic and/or perform dynamic multicast filtering. In one embodiment, an IEEE 802.1p header may include a three-bit field for prioritization. For instance, this may allow network 130 to group data packets into various traffic classes. For example, using a three-bit field for prioritization may establish eight levels of priority. Network 130 may be configured with any prioritization mapping. In one embodiment, a prioritization mapping may be stored in memory coupled to network 130, such as MIB 150, among others.

In several embodiments, a prioritization mapping may include a three-bit number (e.g., 000 through 111 in binary or, equivalently, 0 through 7 in decimal) associated with a priority level. In one instance, network-critical traffic such as a Routing Information Protocol (RIP) (e.g., RIP version 2) and/or an Open Shortest Path First (OSPF) table updates may be given a highest priority. For example, the highest priority may be seven in the prioritization mapping. Delay-sensitive applications such as interactive video and/or voice may be associated with moderately high priority values of five or six in the prioritization mapping. Other traffic or data classes may range from streaming multimedia and/to business-critical traffic, such as traffic from a database, down to "loss eligible" traffic. The streaming multimedia and/to business-critical traffic may be associated with moderate priority values around five or four in the prioritization mapping while the loss eligible traffic may be associated with a value of zero in the prioritization mapping. For example, a zero value may be used as a default. For instance, a zero value may be invoked automatically when no other value has been set.

In various embodiments, network 130 may use VLANs and QoS in tandem (e.g., IEEE 802.1q and IEEE 802.1p in tandem). In one embodiment, a VLAN tag may include two parts, a twelve-bit VLAN ID and a three-bit prioritization. In one example, this may allow network 130 to support a plurality of priority levels for a plurality of VLANs. In a second example, this may allow network 130 to support a plurality of priority levels within one or more VLANs.

In several embodiments, network 130 and/or NMD 105 may provide policy-based routing from one or more computer systems to one or more networks. For example, an employee of the retail entity may use a PCD 110C. PCD 110C may be coupled to network 130A. For instance, PCD 110C may be coupled to network 130A through wireless AP 120. In one instance, the employee may use PCD 110C to communicate a computer system of retail entity, such as a retail entity gateway device 108 (e.g., a router, a virtual private network device, a VPN tunnel terminator or endpoint, etc.). NMD 105 and/or network 130A may route the communication to a VPN associated with retail entity gateway device 108. In a second instance, the employee may use PCD 110C to communicate a BOD 102A. NMD 105 and/or network 130A may route the communication to BOD 102A. For example, PCD 110C may interface with BOD 102A to place an order for food and/or beverages. In a third instance, the employee may use PCD 110C to communicate a web server available through Internet 170. NMD 105 and/or network 130A may route the communication to Internet 170.

Figure 3E:
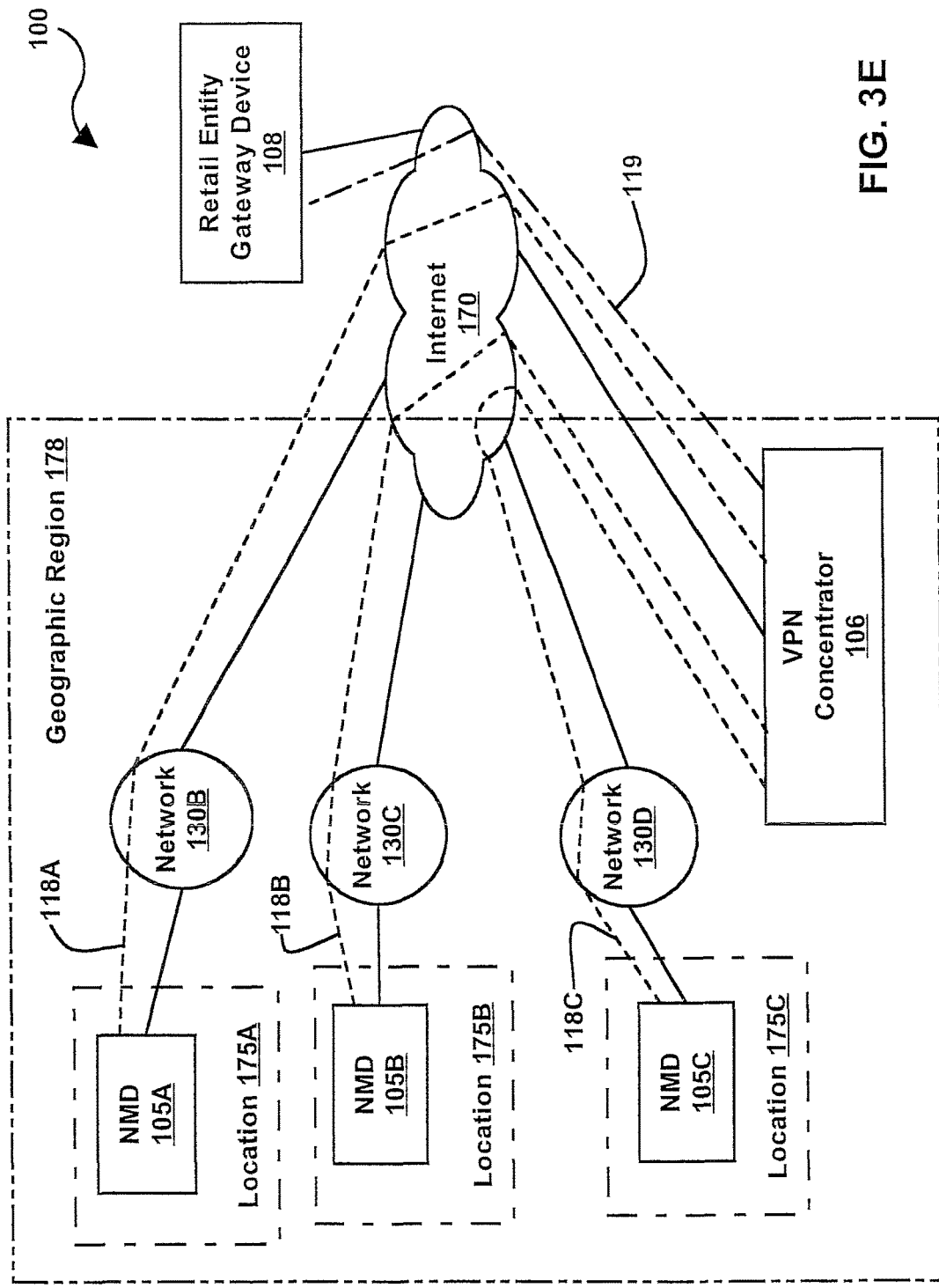
FIG. 3E is block diagram of a network communication system, according to various embodiments.

In several embodiments, NCS 100 may allow a NMD 105 may communicate with a retail entity gateway device 108 using one or more secure systems and/or methods. FIG. 3E illustrates NMDs 105A-105C communicates with a VPN concentrator 106, according to various embodiments. In one embodiment, each NMD 105A-105C communicates with VPN concentrator 106 using VPNs 118A-118C, respectively. In one example, each VPN 118 may include an IPSec, GRE, PPTP, IP over IP, or other tunnel (or a combination of tunneling technologies to achieve desired connectivity and routing of data). In various embodiments, VPN concentrator 106 may include one or more computer systems and/or one or more routers. According to one embodiment, VPN concentrator 106 may allow communication of information to and from retail entity gateway device 108 through a VPN 119. For instance, VPN 119 may include an IPSec tunnel.

Figure 3F:
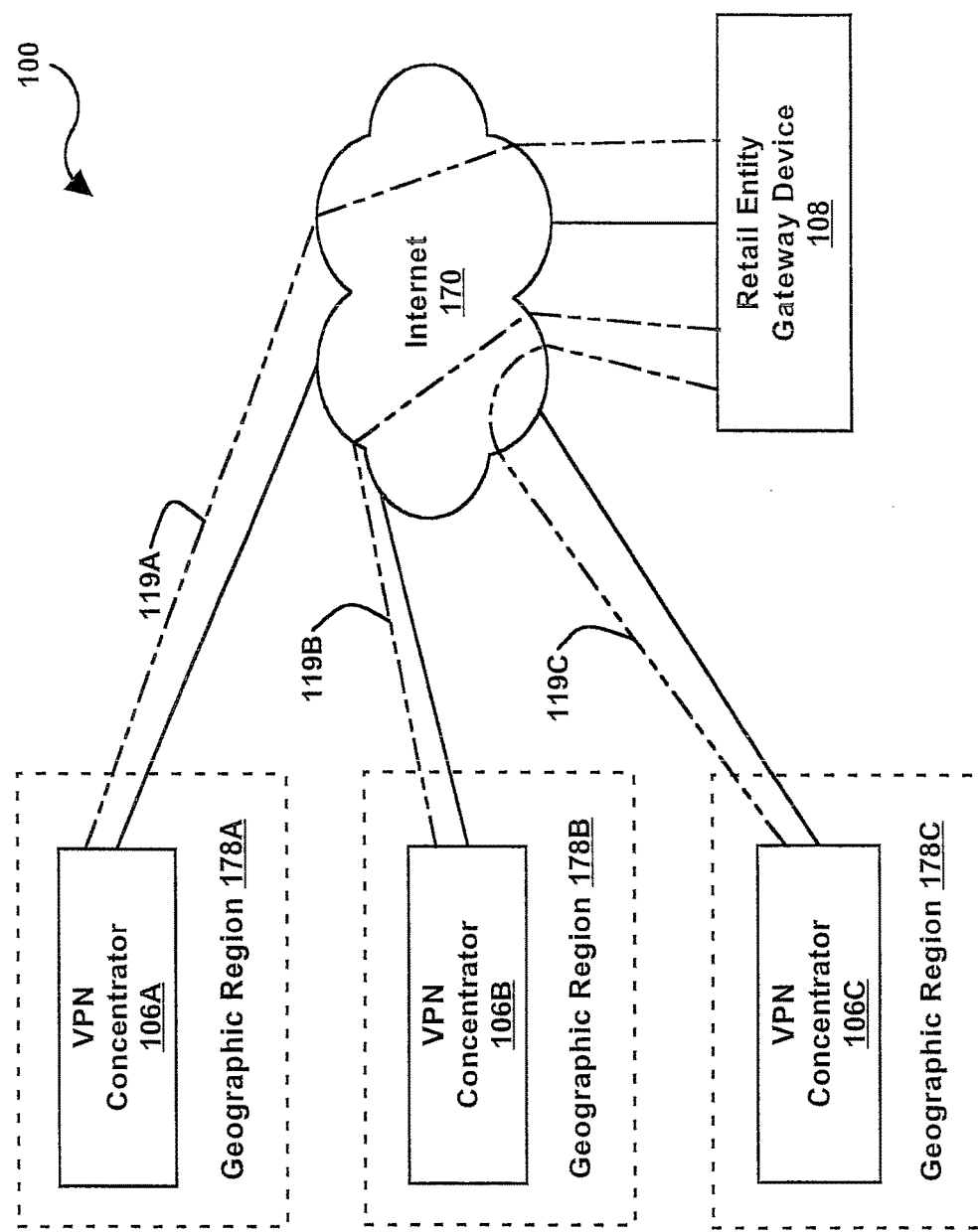
FIG. 3F is block diagram of a network communication system, according to various embodiments.

In various embodiments, NCS 100 may include one or more VPN concentrators 106 which may be distributed in one or more geographic regions, as shown in FIG. 3F. For example, VPN concentrators 106A-106C may provide communication service with NMDs in geographic regions 178A-178C, respectively. For instance, each of the VPN concentrators 106A-106C may use VPNs 119A-119C, respectively, to communicate with retail entity gateway device 108.

In several embodiments, various BODs 102 distributed throughout one or more geographic regions may be available through VPN concentrators 106, VPNs 119, VPNs 108, and NMDs 105. In one embodiment, a first BOD 102 may be coupled to a first NMD 105, and a second BOD 102 may be coupled to a second NMD 105. The first and second BODs 102 may communicate in with each other in a secure fashion. According to one embodiment, each BOD 102 may be associated with a private address, such as a private internet protocol (IP) address. For example, each BOD 102 may be reached or available through its private address.

Figure 3G:
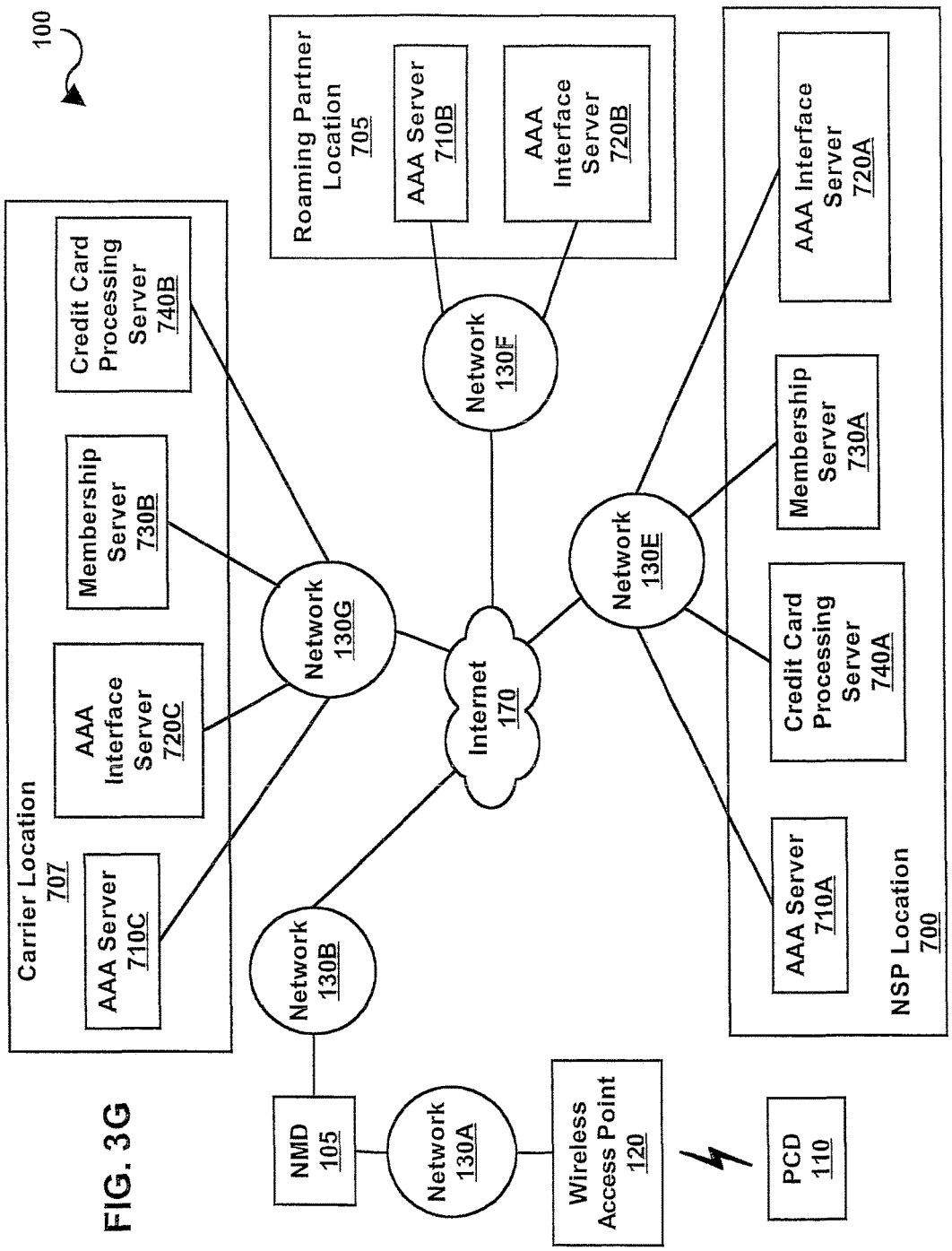
FIG. 3G is block diagram of a network communication system, according to various embodiments.

In various embodiments, NCS 100 may include networks 130E-130G, as shown in FIG. 3G. Each of the networks 130E-130G may be coupled to a network, such as Internet 170. NCS 100 may include AAA servers 710A-710C coupled to networks 130E-130G, respectively. NCS may include AAA interface servers 720A-720C coupled to networks 130E-130G, respectively. NCS 100 may include membership server 730A coupled to network 130E and membership server 730B coupled to network 130G. NCS 100 may include credit card processing server 740A coupled to network 130E and credit card processing server 740B coupled to network 130G. These servers may be located in various locations. In various examples, AAA server 710C, AAA interface server 720C, membership server 730B, and credit card processing server 740B may be located at a carrier location 707; AAA server 710B and AAA interface server may be located at a roaming partner location 705; AAA server 710A, AAA interface server 720A, membership server 730A, and credit card processing server 740A may be located at a network service provider location 700; or other configurations may be used as well.

Memory Medium and Carrier Medium

One or more of the systems described above, such as PCDs 110, APs 120, BODs 102, MIB 150, content providers 160, and NMDs 105 may include a memory medium on which computer programs or data according to the present invention may be stored. For example, each of the APs 120 and/or MIB 150 may store a data structure as described above comprising information regarding identification information, corresponding networks, and access information such as associated data routing methods. Each of the APs 120 and/or MIB 150 may further store a software program for accessing these data structures and using the information therein to properly provide or route data between personal computing devices and networks, or to selectively provide or route data depending on the access information.

The term "memory medium" is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Also, each of the systems described above may take various forms, including a personal computer system, mainframe computer system, workstation, network appliance, Internet appliance, personal digital assistant (PDA), an embedded computer system, television system or other device. In general, the term "computer system" can be broadly defined to encompass any device having a processor which executes instructions from a memory medium.

The memory medium in one or more of the above systems thus may store a software program or data for performing or enabling access or selective network access. A CPU or processing unit in one or more of the above systems executing code and data from a memory medium comprises a means for executing the software program according to the methods or flowcharts described below.

Various embodiments further include receiving or storing instructions and/or data implemented in accordance with the present description upon a carrier medium. Suitable carrier media include memory media as described above, as well as signals such as electrical, electromagnetic, or other forms of analog or digital signals, conveyed via a communication medium such as networks and/or a wireless link.

Figure 4:
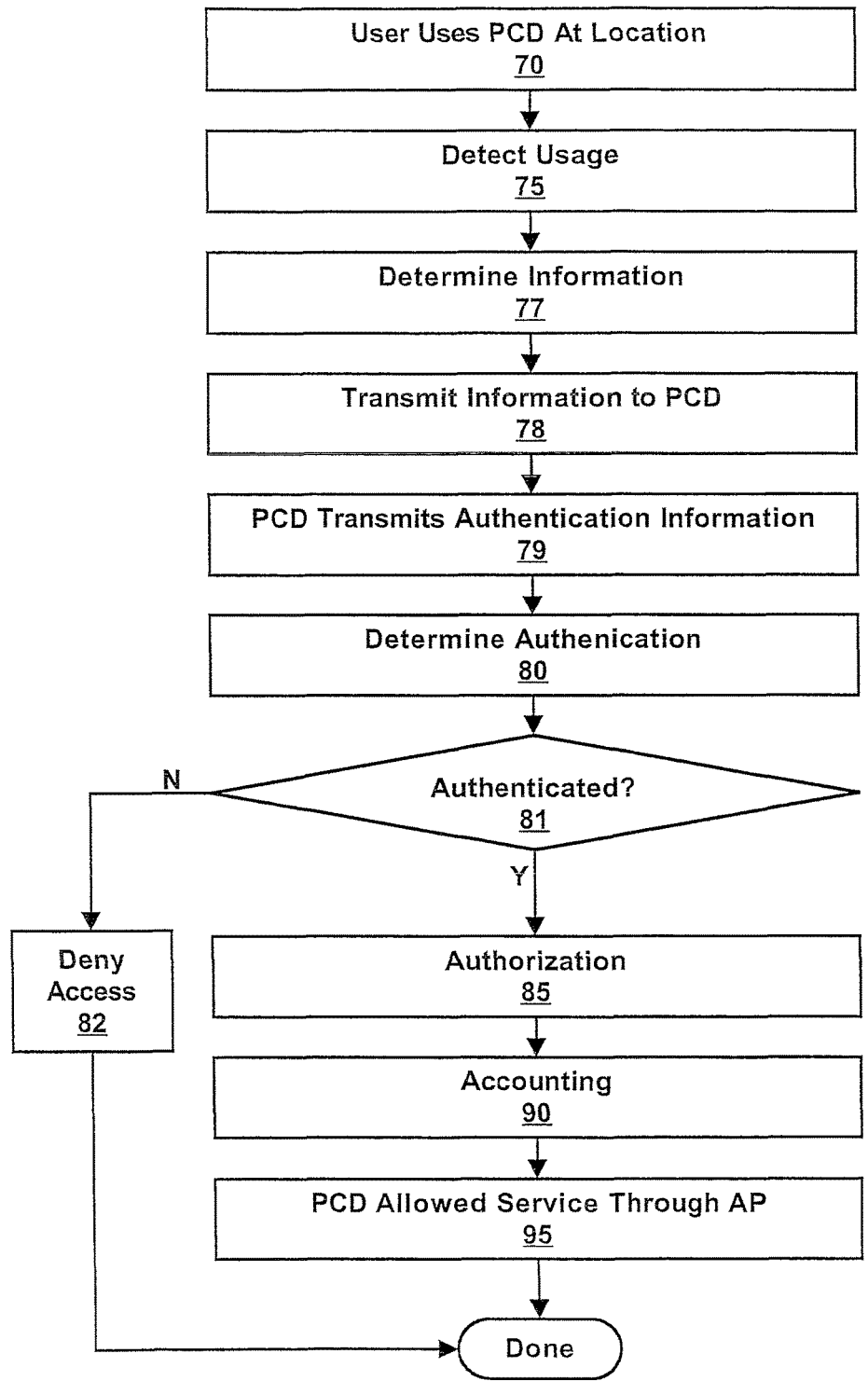
FIG. 4 illustrates a flowchart diagram of a user using a portable computing device at a location of a retail entity, according to various embodiments.

FIG. 4—Service Through Access Points

FIG. 4 illustrates a method of a user using a PCD 110 at a location 175 of a retail entity, according to various embodiments. It is noted that in various embodiments one or more of the method elements may be performed concurrently, in a different order, or be omitted. Additional elements may be performed as desired.

At 70, the user may use PCD 110 to access service through an access point (AP) 120 at location 175 of the retail entity. For instance, service through AP 120 may include services of one or more networks mentioned above. For example, the service may include access to content. The content may include media such as electronic magazines, electronic newspapers, and/or websites, among others. The content may include media such as audio and/or video. Some or all of said content may be cached on a local cache device 162.

In various embodiments, the content may be provided by the NSP. According to one embodiment, the NSP may provide the content from a computer system at location 175. In one embodiment, the content may be provided by one or more content providers, such as content providers 160A-160B. In various embodiments, the content may be provided for a fee. In several embodiments, the content may be provided after authenticating a promotional code. In some embodiments, the content may be based on a geographic location of PCD 110 and/or AP 120. For more information on the use of geographic location information for providing geographic based services, please see U.S. Pat. No. 5,835,061, referenced above.

In several embodiments, at 75, a usage by PCD 110 and/or a request for service from PCD 110 may be detected. In one example, a System ID (e.g., a SSID and/or ESSID, among others) used by PCD 110 to communicate with AP 120 may be detected. For instance, each wireless AP 120 may be operable to "listen for" or "detect" a plurality of different System IDs which may correspond to a plurality of different possible network providers or carriers, or which may correspond to unknown network providers or carriers. Various embodiments may include various systems and/or methods for detecting a usage and/or a request for service. In one embodiment, PCD 110 may attempt to access a web server by transmitting a request for a web page of the web server. At 77, according to one embodiment, available pricing and/or service options may be determined. In one embodiment, a web page to present to PCD 110 may be determined, at 77. For example, the web page may include the determined pricing and/or service options. At 78, the web page may be transmitted to PCD 110. According to one embodiment, the web page may instruct the user of PCD 110 to submit identification and/or authentication information. In various embodiments, a redirect (e.g., a hypertext transfer protocol or HTTP 302 redirect) to a web page may be transmitted to PCD 110, at 78.

In several embodiments, PCD 110 may use customized client software to request service. At 75, the request from or usage of the client software may be detected. Information to send to the client software may be determined, at 77. Determining the information to send to the client software may be based on information received from the request. At 78, the NSP may transmit the information to PCD 110.

In various embodiments, PCD 110 may transmit various authentication information, at 79. In one embodiment, PCD 110 may transmit authentication information from a web browser to a web server. According to one embodiment, PCD 110 may transmit authentication information from client software to a web server or another type of server.

At 80, an authentication process may be used to determine if service may be granted. In several embodiments, authentication may include a process of identifying an individual. In various embodiments, authentication may be based on an idea that each individual user has substantially unique information that sets him or her apart from other users. Authentication may be based on a username and password combination, an X.509 certificate, or other credentials, such as biometric information from a human being based on physiological and/or behavioral characteristics. For instance, the username and password combination may include a telephone number and a personal identification number (PIN). The biometric information, for example, may include fingerprint information, a hand geometry, retina information, iris information, facial information, signature information, DNA information, and/or voice information, among others.

In various embodiments, authentication information may include payment information. For instance, information (e.g., a web page) transmitted to PCD 110 may request the user to enter credit card or debit card information for access to network service. For example, the authentication information may include credit card or debit card information.

In several embodiments, prepaid card information may be used as authentication information. For instance, information (e.g., a web page) transmitted to PCD 110 may request the user to enter prepaid card information for access to network service. For example, a prepaid card may include a balance for services associated with a NSP and/or a carrier. When the prepaid card is used for services, an amount of the balance may be debited from it. The prepaid card information may include a string of characters. The prepaid card information may be entered via an input device, such as a keyboard or its equivalent. In one embodiment, a prepaid card may be associated with only one carrier.

In various embodiments, authentication information may include access code information. For instance, information (e.g., a web page) transmitted to PCD 110 may request the user to enter access code information for access to network service. According to one embodiment, the authentication information may include an access code. For instance, an access code may be a substantially unique string of characters distributed to a user of PCD 110. The access code may be entered via an input device, such as a keyboard or its equivalent, of PCD 110. For more information on the use of access codes for providing access to network services, please see U.S. patent application Ser. No. 10/797,430, referenced above.

In several embodiments, a user of PCD 110 may agree to an "Acceptable Use Policy" (AUP) before service may be granted. The AUP may include various definitions of services available to PCD 110. The AUP may include various definitions of services not available to PCD 110. The AUP may include guidelines and/or restrictions for using one or more services and/or acceptable use of the one or more services.

In various embodiments, authentication may be determined at NMD 105. For example, an access code may be authenticated at NMD 105. In several embodiments, NMD 105 and/or PCD 110 may communicate with one or more remote computers system to determine authentication. In several embodiments, NMD 105 and/or PCD 110 may communicate with the one or more remote computer systems using use one or more secure methods and/or systems. For example, NMD 105 and/or PCD 110 may communicate with the one or more remote computer systems using transport layer security (TLS), HTTPS (secure HTTP), and/or a secure socket layer (SSL). For example, the one or more remote computer systems may include a membership server 730 and/or a credit card processing server 740, among others. For instance, membership server 730 and/or credit card processing server 740 may provide an authentication response in response to receiving authentication information. In several embodiments, NMD 105 may receive the authentication response and determine if the authentication response indicates whether or not PCD 110 is authenticated, at 81.

In various embodiments, the authentication process may include transmitting the identification and/or authentication information associated with the user of PCD 110 to a computer system and may include receiving an authentication response. If no authentication response was received, access to service may be denied at 82. In one embodiment, a predetermined amount of time may transpire before it may be determined that no authentication response was received. If the authentication response indicates the user is not authenticated, access to service may be denied at 82.

According to one embodiment, at 82, an access level or privilege level of the user may be set to a lowest possible level. For example, the user may only have access to specified local and/or limited resources but no external service, e.g., service of Internet 170. The specified local resources may include advertising, maps and/or other information of the retail entity and/or surroundings of location 175, and/or online shopping, among others. The local and/or limited resources may include limited access to several web servers available through Internet 170 to provide advertising, maps and/or other information.

If the authentication response indicates that the user has been authenticated, service may be granted. At 85, an authorization process may be used. In various embodiments, authorization may include a process of granting or denying a user access to one or more network services and/or one or more resources (e.g., content). In one embodiment, authorization may commence after the user has been authenticated. According to one embodiment, an amount of services and/or content the user may access may depend on an authorization level of the user. For example, the user may be able to access one or more maps and/or advertising with a first authorization level. The user may be able to access one or more songs and/or videos with a second authorization level. In one embodiment, the authorization level may be determined, at least in part, by the geographic location of PCD 110 and/or AP 120. According to one embodiment, content provider 160 may determine and/or use the authorization level for providing content to the user of PCD 110. For more information on the use of access and/or authorization levels, please see U.S. patent application Ser. No. 09/707,729, referenced above.

At 90, an accounting process may be used. In several embodiments, accounting may include a process of keeping track of a user's activity while accessing the services and/or resources. Services and/or resources may include an amount of time spent on a network, services accessed while on the network, and/or an amount of data transferred during a session, among others. Accounting information may be used for trend analysis, capacity planning, billing, auditing, and/or cost allocation, among others. According to one embodiment, the NSP may store at least a portion of the accounting information in a database. In one embodiment, the NSP may store a portion of the accounting information in a management information base, such as MIB 150.

In various embodiments, authentication, authorization, and accounting (or "AAA") processes or services of 80, 85, and 90, respectively, may be used with one or more computer systems to provide AAA processes or services. RADIUS (Remote Authentication Dial-In User Service) is an example of an AAA service used by many Internet Service Providers (ISPs). (The RADIUS specification is maintained by a working group of the Internet Engineering Task Force, the main standards organization for the Internet.) When a user connects to the ISP, the user's username and password may be transmitted to an AAA server (e.g., a RADIUS server) or to an AAA interface server (e.g., a web server). The AAA server may then check that the information is correct and authorize access to the ISP's system. Other protocols for providing an AAA framework may include DIAMETER (an extension and improvement of RADIUS), EAP (Extensible Authentication Protocol), TACACS (Terminal Access Controller Access Control System), TACACS+, and/or XTACAS, 802.1x, WPA, 802.11i, among others. In several embodiments, these may also be used for applications, such as access to network service or Internet protocol (IP) mobility, and are intended to work in both local AAA and roaming situations.

Roaming Access

In various embodiments, a user may access network services via a carrier with whom the user has no prior relationship. The user may subscribe to a network provider which is not the carrier. In one embodiment, the network provider may provide the user with a single bill at the end of the month for all of his or her network services (or, in some cases provide for a pre-paid subscription service). The network provider may provide or operate various network services itself, or the network provider may be considered an "aggregator" that does not own or operate any networks but provides infrastructure for enabling its subscribers to gain network service at sites or locations from one or more other network providers and/or carriers. The network provider that has the billing relationship with the user with whom the carrier has no prior relationship may be referred to herein as a "roaming partner". In other words, subscribers of a roaming partner may be permitted to roam on various network infrastructures provided by one or more other network providers and/or one or more carriers.

For example, the carrier and a roaming partner may have an agreement or contractual relationship that allows subscribers of the roaming partner to roam on one or more network infrastructures of the carrier. In various embodiments, one or more carriers may have agreements with one or more roaming partners. In other words, subscribers of each of the roaming partners may roam on various network infrastructures controlled, operated, and/or maintained by a carrier.

In several embodiments, various methods and/or systems may enable a user to roam on a network infrastructure. In one embodiment, a user may use a web browser to obtain roaming network services. According to one embodiment, a user may use client software to roam on a network infrastructure. Various embodiments may include using a standard RADIUS login with a RADIUS-qualified username and password.

When a web browser is used, the web browser may receive information associated with a welcome page transmitted in 78. The custom welcome page may permit the user to choose a connection type for accessing the internet: for example, by purchasing a connection (e.g., using a credit card or hotel account), by using an existing membership with the service provider, by using a coupon to purchase a connection, or by using a roaming connection with a roaming provider (e.g., entering a RADIUS name and password).

The user may submit his or her RADIUS username and password. The username should be RADUIS-resolvable so that an AAA server 710A from the network provider may properly proxy to an AAA server 710B from the roaming partner. For example, the username may be of the form: "COMPANYX/myusername@CompanyX.com". According to one embodiment, an authentication response from AAA server 710B may indicate that the user is not authenticated, at 80. In several embodiments, NMD 105 may receive the authentication response and determine if the authentication response indicates whether or not PCD 110 is authenticated, at 81. In various embodiments, AAA server 710A may receive the authentication response and determine if the authentication response indicates whether or not PCD 110 is authenticated, at 81. At 82, the user may be denied access if the authentication response indicates that the user is not authenticated. In one embodiment, an authentication response from AAA server 710B may indicate that the user is authenticated, at 80. In various embodiments, PCD 110 may be granted services, such as one or more authorized services of the user's account, at 85.

In addition to authentication information, other information may be exchanged between the network provider and the roaming partner. For example, the network provider may publish service and fee information that is specific to the local site and/or network provider, as well as potentially providing options for different service categories. Similarly, the roaming partner may be able to provide information to the network provider regarding, for example, account information and/or restrictions for the customer. For example, the roaming partner may exchange information with the network provider indicating that the user may only use a world wide web service. In one embodiment, at 85, the network provider may authorize the user to use the world wide web service. According to one embodiment, at 90, a RADIUS "start" record may be generated for accounting purposes. At 95, the user may be allowed access to one or more services (e.g., authorized in 85) through AP 120.

When client software is used, an access request may be detected at 75. In one embodiment, the client software may perform a HTTP "GET" to a web server, not on the subnet to which PCD 110 belongs, to initiate an access request. In another embodiment, the client software may perform a HTTP "GET" to a web server, on the subnet to which the PCD belongs, to initiate an access request. For instance, the web server may have the address of the default gateway or default router of the subnet to which PCD 110 belongs.

When PCD 110 is not currently authenticated for access, at 77, information to transmit to the client software may be determined. The information may include an activation response message. The information may be transmitted to PCD 110 (e.g., to the client software) at 78. For example, the activation response message may include information that is usable to access Internet 170 (e.g., a router address or other network address for the network provider). The activation response message may be returned to the client software as a HTTP redirect (e.g., a HTTP 302 redirect) to a "Terms and Conditions" web page. In one embodiment, the redirect may include a location identifier for the location 175 as well as the access procedure identification as described in Table 1. The location identifier and access procedure information may be included within a valid HTML message, such as a message delimited appropriately with the <HTML> and </HTML> tags. The HTML message may include other valid HTML message elements (e.g., HEAD, BODY, etc.).

TABLE 1

| Information name | Type | Field format/value | Required/optional |
| --- | --- | --- | --- |
| Router IP address | HTTP redirect | "{URL}?{query parameters}" | Required |
| Access procedure | HTML Comment | "<!--access procedure=WY.1-->" | Required |
| Location identifier | HTML Comment | "<!--access location={location ID}-->" | Required |
| Error return | HTML Comment | "<!--error={error number}-->" | Required |

In one embodiment, the {location ID} may include characters such as "wp_" (to identify the network provider or carrier) concatenated with one or more 7-bit ASCII numeric code of one to twenty-nine digits. This location ID may uniquely identify the location at which the access will occur. The HTML message may include an error return string as shown in the above table. Error numbers may be defined appropriately (e.g., 0=successful acceptance of request and 255=undefined system error).

According to one embodiment, client software will not perform a HTTP GET operation to acquire redirected to a location. Rather, the redirect is provided to pass back the {Query parameters} shown above. To make an authentication request, the client software may then form a logon URL in the format "https://roamer.{network provider and domain}/roamer_login.adp", where {network provider and domain} indicates an internet address for the network provider or carrier (e.g., wayport.net or foobazco.net).

At 79, the client software of PCD 110 may then transmit its user's username and password to the network provider (e.g., at the router address indicated by the activation response message). The client software may originate a POST operation to the above-described URL at the internet protocol (IP) address implied by the logon URL at TCP port 443 utilizing a HTTPS (secure HTTP) connection over TCP. The POST parameters may be constructed by appending the arguments "username" and "password" to the {Query parameters} returned in the activation response HTML message. The contents of the username and password fields may be encoded as "text/plain", and the username may include a full NAI (network access identifier) including appropriate roaming-partner prefixes. In several embodiments, the information may be formatted as shown in Table 2.

TABLE 2

| Field name | Type | Field naming/format specification (url encoded) | Required/optional |
| --- | --- | --- | --- |
| Username input field | HTTP POST parameter | type="text" name="username" maxsize="128" | Required |
| Password input field | HTTP POST parameter | type="password" name="password" maxsize="128" | Required |

At 80, authentication may be determined. Determining authentication may include the sending the username and password to a roaming partner for authentication. In one embodiment, an industry-standard RADIUS mechanism may be used for authentication. When a valid login attempt is received from the client software, and the RADIUS username begins with a roaming-partner prefix of the form "ROAMING_PARTNER/" an AAA server may be determined. For example, the determined AAA server may be AAA server 710B. A valid RADIUS authentication request (i.e., an Access-Request) may be transmitted to AAA server 710B of the roaming partner using standard RADIUS proxy procedures.

The roaming partner may determine whether a user account is authenticated (e.g., using the user's RADIUS-compliant username and password) and send an appropriate authentication response back to the network provider. In one instance, the roaming partner associated with the user of PCD 110 may determine if the user account is authenticated. In several embodiments, NMD 105 may receive the authentication response and determine if the authentication response indicates whether or not PCD 110 is authenticated, at 81. In various embodiments, AAA server 710A may receive the authentication response and determine if the authentication response indicates whether or not PCD 110 is authenticated, at 81.

In one embodiment, a roaming partner may attempt to deliver an authentication request to an appropriate authentication authority. The roaming partner may then return the response (typically Access-Accept or Access-Reject) returned by the authentication authority. According to one embodiment, the roaming partner may not return vendor-specific RADIUS attributes sent by the authentication authority. If no response is received from the authentication authority, the roaming partner may return an Access-Reject response to the network provider.

If an authentication response indicates that a user account has not been authenticated, then access of network services for the user may be denied, at 82. If the authentication response indicates that the user account has been authenticated, then authorization to access network services may be granted, at 85.

According to one embodiment, when the logon attempt is successful, an HTML authentication page may be returned to PCD 110. The page may include an HTML comment string of the form "<!--error={error number}-->". The error number may be defined appropriately (e.g., 0=successful acceptance of request, 100=request rejected and login failed, 102=RADIUS communication error, and 255=undefined system error). New error numbers and definitions may be promulgated to the roaming partner by the network provider.

In one embodiment, the authentication page may contain an HTML comment string of the form "<!--AuthMessage={reply message}-->". For example, the {reply message} may include the RADIUS Reply-Message attribute when one is returned in an Access-Reply. The {reply message} may include another message (e.g., an error message) as defined by a carrier.

In one embodiment, if the request was successful, the authentication page may include an HTML comment of the form "<!--SessionId={session key}-->". For example, the {session key} may include a substantially unique alphanumeric string of at least one and not more than twenty characters. According to one embodiment, the session key may be cached by client software until the session has been terminated.

According to one embodiment, the authentication page may also include a parameter which specifies a logout URL and may be of the form "<!--LogoffUrl='https://<site-specific logoff URL>'-->". In one embodiment, to initiate a logoff, client software may send an HTTP POST operation to a computer system servicing the logoff URL. The POST operation may include the session key parameter returned by the last successful login operation.

In one embodiment, when a logoff attempt is received by a carrier, a computer system, such as NMD 105, may return an HTML logoff response page including an HTML comment string of the form "<!--error={error number}-->". For example, the error number may be defined appropriately (e.g., 0=successful logoff, 4=not logged in, and 255=undefined system error).

According to one embodiment, when a session is terminated in response to the expiration of a billing period, the network provider may invalidate the session and emit a RADIUS Acct-Request(STOP). If a client session is active at the time of termination, the network provider may immediately generate an Acct-Request(START). The Acct-Session-Id for the new session may be assigned a substantially unique value.

According one embodiment, a session expiration may occur because the client has not generated any network traffic for a defined "passive logout" interval, granted network services may be terminated. For example, the user may then receive the custom welcome page on the next attempt to access any web page. The user may re-institute a network connection as described previously.

In one embodiment, a user may get a stop record with a session length of zero upon quickly disconnecting after authorization. This connection may still be charged to the user. In various embodiments, use of both a wired and a wireless access point may generate separately chargeable sessions.

According to one embodiment, in determining authentication at 80, an Access-Request may not be acknowledged by a matching Access-Accept or Access-Reject message within a predetermined amount of time transpiring. In one instance, the user may not be granted access to the service. In a second instance, the request may be retransmitted to AAA server 710B. For example, an authentication retransmit interval may have a minimum of ten seconds and a maximum of twenty seconds, and the authentication retry count may have a minimum of three and a maximum of five.

According to one embodiment, the network provider may return particular values for Acct-Terminate-Cause under conditions listed in Table 3.

TABLE 3

| Condition | Value | Value name |
|---|---|---|
| User logout | 1 | User request |
| Access link down | 2 | Lost carrier |
| Idle timeout | 4 | No activity |

TABLE 3-continued

| Condition | Value | Value name |
|---|---|---|
| Max session time exceeded | 5 | Session terminated at conclusion of service billing period |
| Orderly shutdown of network provider access point or following unexpected system restart | 7 | Admin reboot |

In various embodiments, the network provider may provide a periodic (e.g., monthly) invoice summarizing the charges owed by each roaming partner. A billing period for invoices may begin, for example, at midnight GMT on the first day of each calendar month and may end immediately before the beginning of the next billing period.

Whereas RADIUS AAA using PAP (Password Authentication Protocol) is one method of providing authentication information (e.g., the username and password), there are other methods available in various embodiments. For example, another industry standard method is RADIUS AAA using CHAP (Challenge Handshake Authentication Protocol). Interaction with CHAP is typically more complex than PAP in that a "challenge" has to be presented and accepted. This interaction can be accomplished in either a web-based system or in a client-software-based system.

In various embodiments, in the case of a web-based system, a CHAP challenge calculation may be performed by the web browser using a "plug-in," a web browser scripting language such as JavaScript or ActiveX, or a pre-compiled binary such as a Java Applet. Specifically, in the authentication steps, the following is one embodiment:

(1) The Login Webserver displays (via HTTPS) a login page which requests a username and password from the End User.

At this point, a "CHAP Challenge" is embedded into the HTML page returned by the Login Webserver, which will be used by JavaScript in the page to hash the user's password before transmission of the web form submission to the web server.

(2) The User fills-in the username/password fields and clicks the form submission button. This button results in a form submission via HTTPS to the Login Webserver.

At this point, instead of directly submitting the entered data, a JavaScript function may be used to hash the End User's password using the "CHAP Challenge" embedded in the HTML, or the JavaScript function itself, and submit the hashed password instead of the plaintext password. This system and/or method may have an added security advantage of the password never leaving the client machine.

FIG. 5—Virtual Access Points and Virtual Points of Presence

Figure 5A:
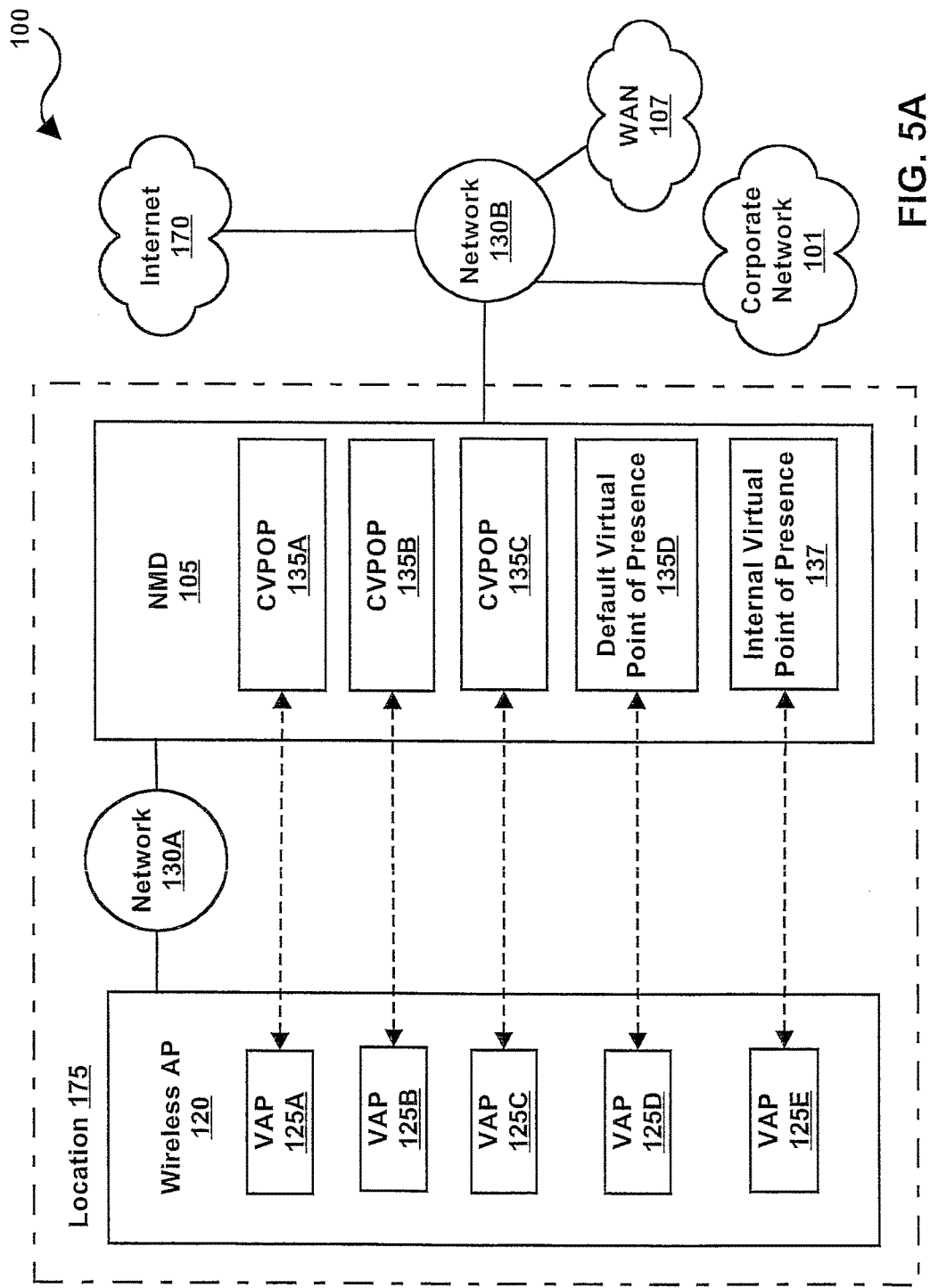
FIG. 5A is block diagram of the network communication system which uses virtual access points and virtual points of presence, according to various embodiments.
Figure 5B:
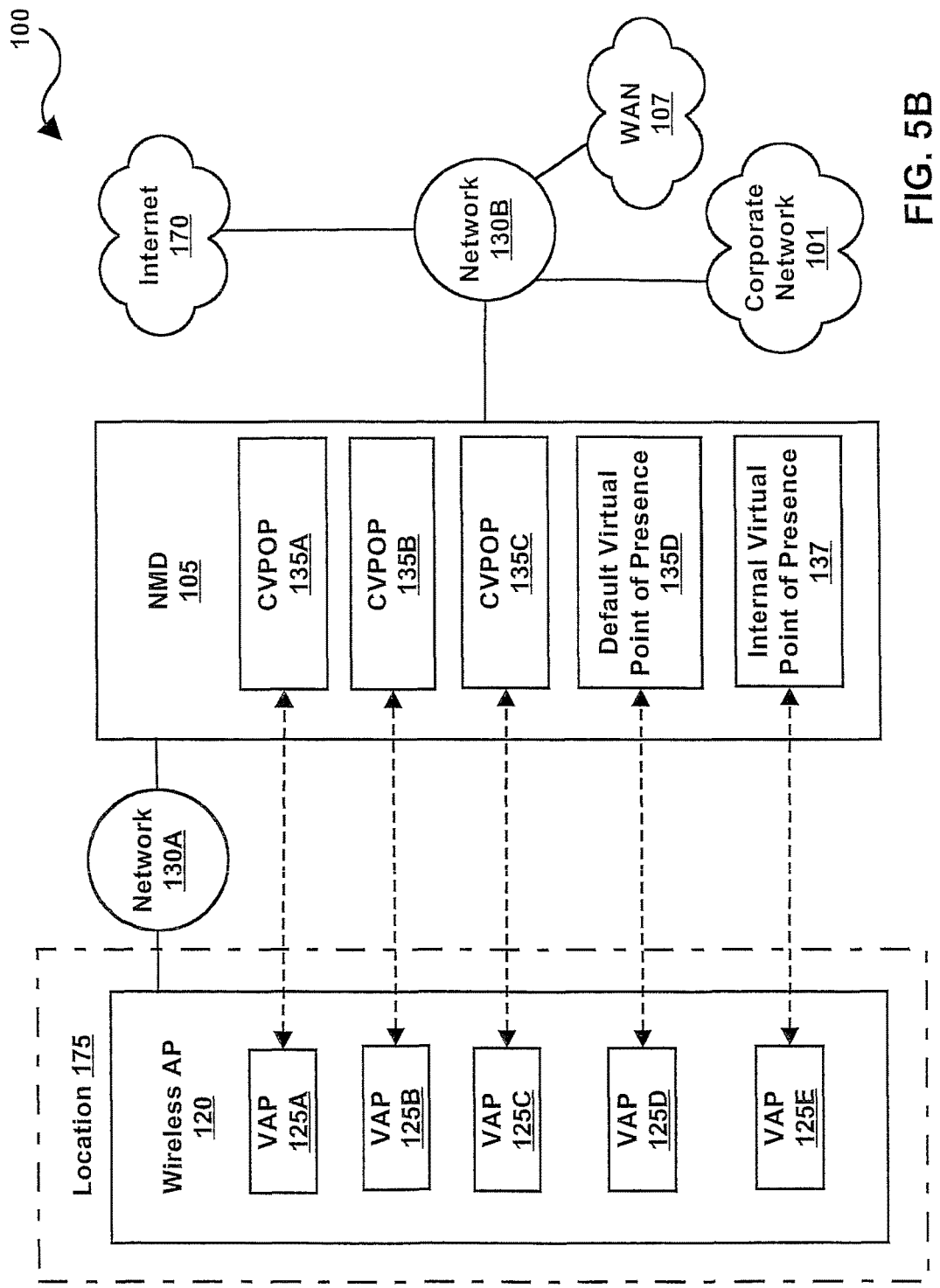
FIG. 5B is block diagram of the network communication system which uses virtual access points and virtual points of presence, according to various embodiments.

FIG. 5A-5B are block diagrams illustrating communication of virtual access points with respective virtual points of presence, according to various embodiments. In some embodiments, AP 120 and NMD 105 may be located at location 175, as shown in FIG. 5A. In various embodiments, AP 120 may be located at location 175 while NMD 105 may not be located at location 175, as shown in FIG. 5B.

Various embodiments may enable a plurality of carriers to utilize a common set of wireless or wired access points at each location 175 to provide their respective services to each carrier's potentially non-overlapping sets of subscribers. This allows use of a single network infrastructure at each location 175, which may minimally impact a wireless spectrum available at a location 175 while allowing a maximum possible number of carriers to offer access to network services and/or other services.

In several embodiments, NCS 100 may service a plurality of carriers. For example, one or more locations 175 of the retail entity may provide service to the plurality of carriers (service to subscribers of each of the plurality of carriers) through one or more APs 120. For instance, wireless AP 120 may be operable to use a first System ID for a first carrier and operable to use a second System ID for a second carrier. The System IDs for the first and second carriers may be IEEE 802.11 Service Set Identifiers (SSIDs) and/or Extended Service Set Identifiers (ESSIDs).

One or more of the wireless APs 120, NMD 105, and/or MIB 150 may include software that enables wireless APs 120 to accommodate or service users of a plurality of different locations and/or different carriers. Thus, a wireless AP 120 may be operable to appear as any one of a plurality of different location wireless APs, meaning that a single wireless AP may "pretend to be" or behave as an access point dedicated to a particular location and/or carriers for each of a plurality of different locations and/or carriers. In other words, according to various embodiments, wireless AP 120 may execute one or more software programs that allow it to act as a wireless AP or virtual AP (VAP) 125 for each of the plurality of locations and/or carriers. These locations may include locations 175C-175D shown in FIG. 3B. Thus, a wireless AP 120 may be capable of broadcasting and/or recognizing any of a plurality of system identifications (SIDS) and maintaining associations between the SIDS and the users of the respective locations and/or one or more carriers. The identification information may be a System ID (an IEEE 802.11 System ID), a MAC ID of a wireless Ethernet device comprised in the PCD 110, the name of the location or a name of a carrier, or other type of information that identifies one or more locations and/or one or more carriers providing network access. Where the wireless network is wireless Ethernet (IEEE 802.11), the identification information or System ID may include a SSID (Service Set ID), an ESSID (Extended Service Set ID) and/or a BSSID (Basic Service Set ID), among others. For more information on virtual access points, please see U.S. patent application Ser. No. 09/767,374, referenced above.

In various embodiments, software and/or information may enable NMD 105 to accommodate or service subscribers of a plurality of different carriers. The software and/or information may implement one or more virtual points of presence. In one example, instead of using a separate NMD for each carrier supported at a location 175, NMD 105 may be operable to appear as a point of presence to any one of a plurality of different carriers at location 175, meaning that a single NMD may "pretend to be" or behave as a point of presence dedicated to a particular carrier for each of a plurality of different carriers. For instance, the retail entity or the NSP may, itself, offer services at a location 175. Software and/or information may implement a default virtual point of presence. In a second example, instead of using a separate NMD for the default virtual point of presence at location 175, NMD 105 may be operable to appear as a default virtual point of presence at location 175, meaning that a single NMD may "pretend to be" or behave as the default virtual point of presence dedicated to location 175. Software and/or information may enable NMD 105 to accommodate or service employees and/or equipment of the retail entity. Software and/or information may implement an internal point of presence. In a third example, instead of using a separate NMD for the internal point of presence at location 175, NMD 105 may be operable to appear as the internal point of presence at location 175, meaning that a single NMD may "pretend to be" or behave as the internal point of presence dedicated to location 175.

In several embodiments, NMD 105 may include software that enables it to behave appropriately for each of a plurality of carriers, a default point of presence, and/or an internal point of presence. For example, instead of implementing a plurality of virtual points of presence, i.e., instead of storing and executing a plurality of virtual carrier points, the default point of presence, and/or the internal point of presence of presence software program instantiations, a single software instantiation may enable this operation. In various embodiments, each virtual carrier point of presence, the default point of presence, and/or the internal point of presence may entail one or more software programs, and each instantiation of a virtual carrier point of presence, the default point of presence, and/or the internal point of presence may utilize a separate instantiation or replication of these one or more software programs. In one embodiment, a single instantiation of one or more software programs may enable the physical point of presence or NMD 105 to behave appropriately for each of a plurality of carriers, the default point of presence, and/or the internal point of presence.

In various embodiments, wireless AP 120 may include a plurality of virtual access points (VAPs) 125. According to one embodiment, each VAP 125A-125D may be, respectively, coupled to a virtual point of presence (VPOP) 135A-135D, as shown in FIGS. 5A-5B. For example, each VAP 125A-125C may be, respectively, coupled to a carrier virtual point of presence (CVPOP) 135A-135C. In several embodiments, each VPOP 135 may include customized functionality associated with one or more systems and/or methods described above with regards to FIG. 4. In one embodiment, each VPOP 135 may present its own web page at 78 of FIG. 4. For instance, default virtual point of presence 135D may present a co-branded web page at 78 of FIG. 4. In one example, the web page may include one or more advertisements for one or more carrier services available at location 175. In a second example, the web page may be considered the main web page. In a third example, the web page may include one or more links to one or more CVPOPs 135A-135C.

In various embodiments, an employee of the retail entity may access various corporate networks of the retail entity, such as corporate network 101, and/or various equipment of the retail entity, such as BODs 102, through the internal point of presence. For instance, one or more BODs 102 such as cash registers and/or credit card debiting computing devices may use one or more network services available through the internal point of presence of NMD 105. An employee of the retail entity, such as a manager or a person of the wait-staff, may use a PCD 110C to access one or more food and/or beverage ordering systems through the internal point of presence of NMD 105, for example. According to one embodiment, a user of PCD 110C may submit authentication information with regards to 79 of FIG. 4. The authentication information may be transmitted to a computer system of the retail entity which may determine authentication in 80 and provide an authentication response to NMD 105. Program instructions implementing internal point of presence 137 may determine if the authentication response indicates whether or not the user of PCD 110C is authenticated, at 81. If the user is authenticated, the user may be granted services that are authorized at 85. In various embodiments, internal point of presence 137 may provide policy based routing for communications with various computer systems available within and outside NCS 100. If the user is not authenticated, the user may be denied service, at 82.

In several embodiments, a VAP 125 may be coupled to a CVPOP 135A, a default virtual point of presence (DVPOP) 135D, or an internal virtual point of presence (IVPOP) 137 through with one or more virtual local area networks (VLANs) (IEEE 802.1q). For instance, wireless AP 120 and NMD 105 may communicate using tagged VLANs. For example, VAP 125A may communicate with CVPOP 135A using a first VLAN tag. VAP 125B may communicate with CVPOP 135B using a second VLAN tag. VAP 125D may communicate with DVPOP 135D using a third VLAN tag. VAP 125E may communicate with IVPOP 137 using a fourth VLAN tag. In various embodiments, wireless AP 120 may use a different VLAN tag to communicate information from each PCD 110 to NMD 105 where each PCD 110 uses a different System ID (e.g., SSID and/or ESSID, among others). In several embodiments, a PCD 110 may communicate with DVPOP 135D, IVPOP 137 and/or CVPOP 135A using one or more secure systems and/or methods.

In various embodiments, a VAP 125 may be coupled to a CVPOP 135A, a DVPOP 135D, or an IVPOP 137 by one or more tunnels. In several embodiments, each tunnel may use a different tunneling protocol. A tunneling protocol may include point to point tunneling protocol (PPTP), point to point over Ethernet (PPoE), general route encapsulation (GRE), IPSec, and/or IP-in-IP, among others.

FIG. 6—Communication with Multiple Carriers

Figure 6A:
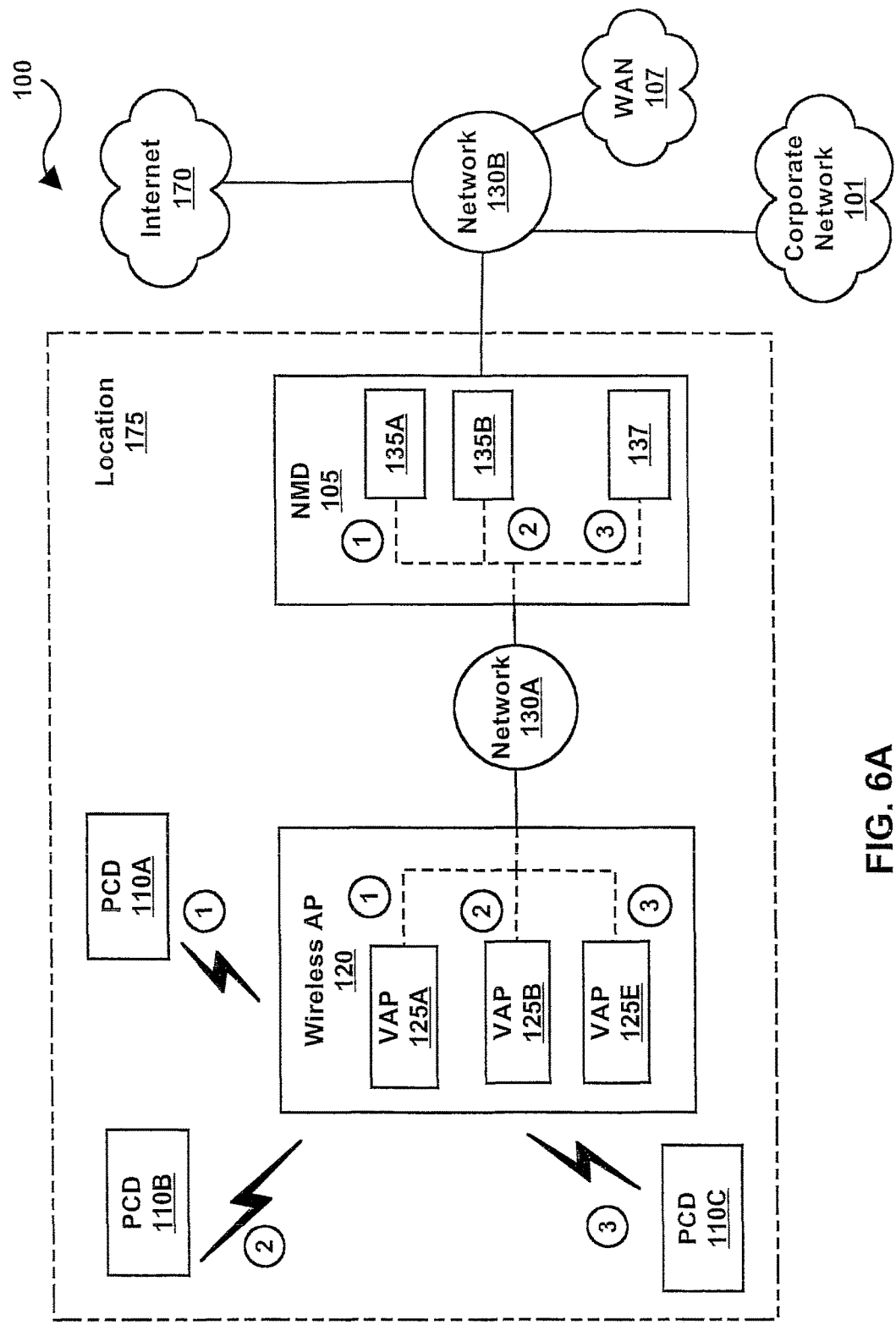
FIG. 6A is block diagram of various portable computing devices using the network communication system which uses virtual access points and virtual points of presence, according to various embodiments.
Figure 6B:
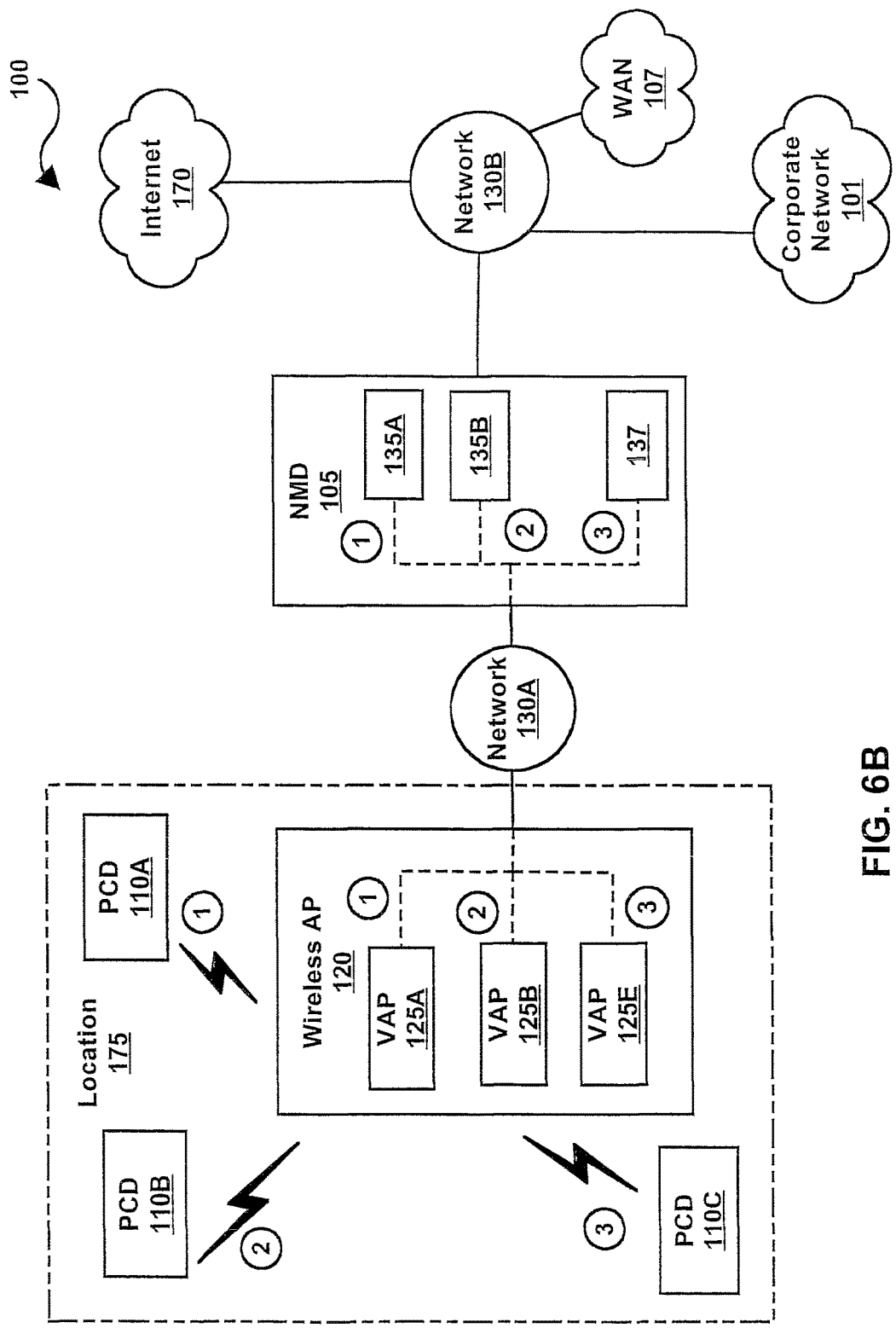
FIG. 6B is block diagram of various portable computing devices using the network communication system which uses virtual access points and virtual points of presence, according to various embodiments.

FIG. 6A-6B are block diagrams illustrating communication with multiple carriers, according to various embodiments. In some embodiments, AP 120 and NMD 105 may be located at location 175, as shown in FIG. 6A. In various embodiments, AP 120 may be located at location 175 while NMD 105 may not be located at location 175, as shown in FIG. 6B. In some embodiment, wireless AP 120 may include VAP 125A, 125B, and 125E.

For example, a first carrier may include a name such as "The Foobazco Telephone Company". A PCD 110A may use a SSID and/or ESSID of "Foobazco" to communicate with wireless AP 120. In one embodiment, PCD 110A may use the SSID and/or ESSID of "Foobazco" to communicate with VAP 125A. For instance, this may indicate that that the one or more PCDs 110 using the SSID and/or ESSID of "Foobazco" to communicate with wireless AP 120 are associated with the first carrier. In one embodiment, elements of NCS 100 may present CVPOP 135A to PCD 110A.

In various embodiments, the Foobazco Telephone Company may compensate the NSP (e.g., pay the NSP a fee) for wireless AP 120 to broadcast the SSID and/or ESSID of "Foobazco". Broadcasting the SSID and/or ESSID may indicate that one or more services of the first carrier may be available through wireless AP 120.

A second carrier may include a name such as "The Wellcent Cellular Telephone Corporation". A PCD 110B may use a SSID and/or ESSID of "Wellcent" to communicate with wireless AP 120. In one embodiment, PCD 110B may use the SSID and/or ESSID of "Wellcent" to communicate with VAP 125B. For instance, this may indicate that that the one or more PCDs 110 using the SSID and/or ESSID of "Wellcent" to communicate with wireless AP 120 are associated with the second carrier. In one embodiment, elements of NCS 100 may present CVPOP 135B to PCD 110B.

In various embodiments, the Wellcent Cellular Telephone Corporation may compensate the NSP (e.g., pay the NSP a fee) for wireless AP 120 to broadcast the SSID and/or ESSID of "Wellcent". Broadcasting the SSID and/or ESSID may indicate that one or more services of the second carrier may be available through wireless AP 120.

In several embodiments, wireless AP 120 may concurrently use the System IDs such as SSIDs and/or ESSIDs of "Foobazco" and "Wellcent", among others, to communicate with one or more PCDs 110. In various embodiments, wireless AP 120 may concurrently broadcast "Foobazco" and "Wellcent", among others.

Figure 7:
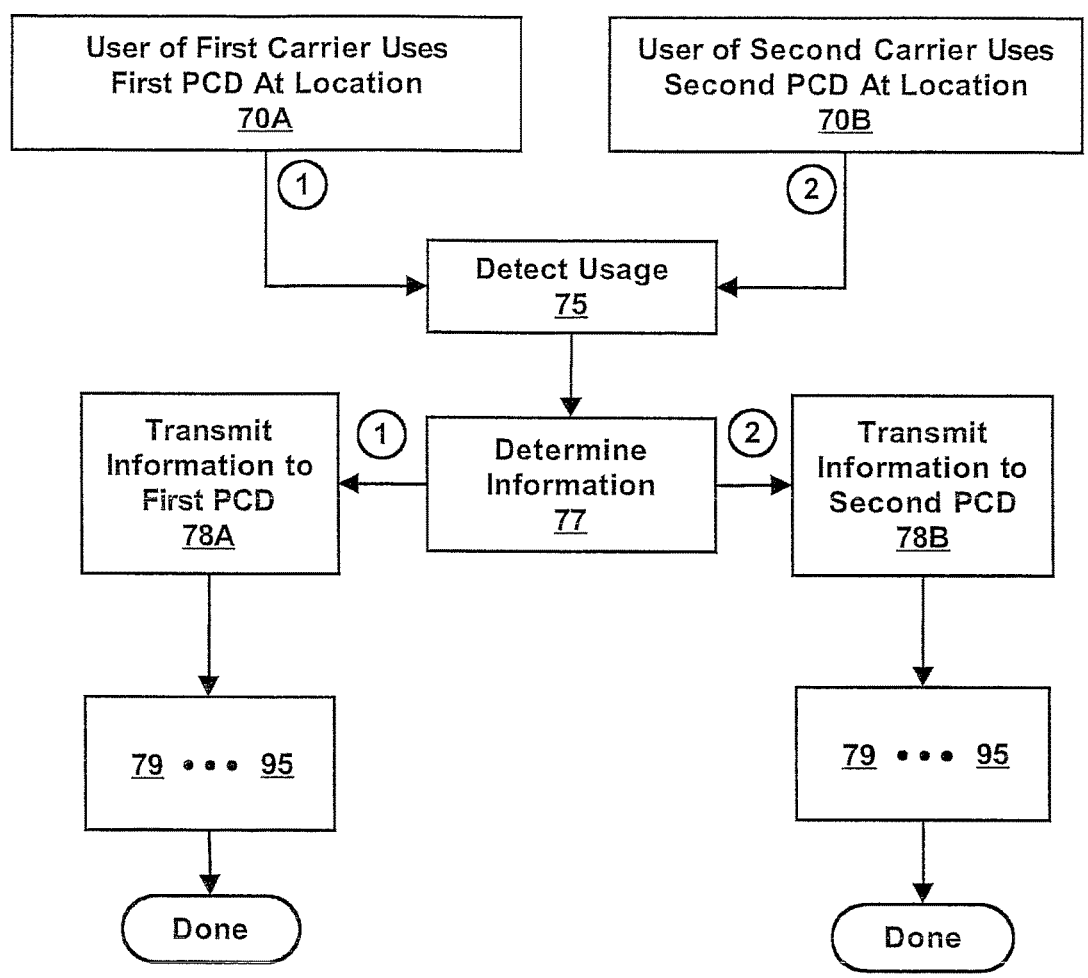
FIG. 7 illustrate a flowchart diagram of a plurality of a portable computing devices using the network system at a location of a retail entity, according to various embodiments.

FIG. 7—Service Through Multiple Carriers

FIG. 7 illustrates a flowchart of a customer or subscriber of a first carrier using a first PCD, such as PCD 110A, at a location 175 of a retail entity and a customer or subscriber of a second carrier using a second PCD, such as PCD 110B, at location 175 of the retail entity, according to various embodiments. For example, at 70A, PCD 110A may use a SSID and/or ESSID of "Foobazco" to communicate with AP 120. This may indicate the first carrier. PCD 110B may use a SSID and/or ESSID of "Wellcent" to communicate with AP 120, at 70B. This may indicate the second carrier. It is noted that in various embodiments one or more of the flowchart elements may be performed concurrently, in a different order, or be omitted. Additional elements may be performed as desired.

At 75, usage by PCD 110A and/or PCD 110B or a request for service from PCD 100A and/or PCD 110B may be detected. Various embodiments may include various systems and/or methods for detecting a usage and/or a request for service. In one embodiment, PCD 110A and/or PCD 110B may attempt to access one or more web servers. At 77, information may be determined to send to a PCD 100. The information may include various options which may be based on a SSID and/or ESSID used to communicate with wireless AP 120. According to one embodiment, determining information at 77 may include determining program instructions to execute and/or data to transmit to a PCD 110. For example PCD 110A may use VAP, 125A, as discussed above. At 77, program instructions associated with CVPOP 135A may be executed. PCD 110B may use VAP 125B, as discussed above. At 77, program instructions associated with CVPOP 135B may be executed.

In various embodiments, the information may include a web page. In several embodiments, the information may include a redirect (e.g., a hypertext transfer protocol or HTTP 302 redirect) to the web page.

In various embodiments, determined information may indicate that the web page presented to PCD 110A be a web page associated with the first carrier. The web page may include content such as advertisements and/or promotions associated with the first carrier. The advertisements and/or promotions may be based on a geographic location of PCD 110A and/or wireless AP 120. In one embodiment, the user of PCD 110A may be presented with specified content and/or service through wireless AP 120 until the user is authenticated. For example, before the user is authenticated, the user may only have access to information associated with the first carrier and/or location 175 of the retail entity. For instance, the user may access one or more web pages before he or she is authenticated. These web pages may be considered a "walled-garden". The walled-garden may include information associated with an authentication process or method that the user of PCD 110A may use. At 78A, a first walled-garden or a portion of the first walled garden may be transmitted to PCD 110A. In one embodiment, the first walled-garden may be produced by program instructions included in CVPOP 135A.

In several embodiments, the user of PCD 110B may be presented a second, different, walled-garden, at 78B. For example, the second walled-garden may include information and/or content associated with the second carrier. In one embodiment, the second walled-garden may be produced by program instructions included in CVPOP 135B. In various embodiments, the users of PCD 110A and PCD 110B may proceed with method elements 79-95 with reference to FIG. 4.

Wireless Access Point Usage of Multiple Channels

In various embodiments, wireless APs 120 may concurrently use one of a plurality of different RF (radio frequency) channels for communication with computing devices of users. In one example, wireless AP 120 can use one of RF channels 1 through 11. As is well known, RF channels 1, 6 and 11 are non-overlapping, with the remainder of these channels being partially overlapping with other channels. In a second example, wireless AP 120 may use one or more channels in a first frequency band such as 2.4 GHz and concurrently use one or more channels in a second frequency band such as 5 GHz. In one embodiment, channels in one frequency band may provide more bandwidth than channels in another frequency band. The term "frequency band" may be used to describe any range of contiguous radio frequencies.

In several embodiments, each wireless AP 120 can communicate on one or more, e.g. a plurality of or all of, the available wireless channels, e.g., the available RF channels. Furthermore, each of the wireless AP 120 may control which channel PCD 110 is able to use. In one embodiment, each PCD 110 may scan each of the RF channels until it detects a wireless AP 120 at one of the channels.

In one embodiment, one or more of the wireless APs 120 may each utilize a plurality of the RF channels, e.g., may use each of the non-overlapping channels 1, 6 and 11 to effectively provide up to three times the channel capacity. Thus, one or more of the wireless APs 120 may be able to control allocations of a plurality or all of the respective RF channels to selectively obtain higher bandwidth when appropriate, or to simply accommodate a greater number of computing devices 110. Thus, if wireless AP 120A using only one RF channel could only handle fifty computing devices 110 on that respective channel, the wireless AP 120A may operate to use three non-overlapping RF channels to effectively triple this capacity to a total of 150 concurrent or simultaneous PCDs 110.

In one example, if wireless AP 120A is only communicating with one PCD 110, then the wireless AP 120A may optionally or selectively use three non-overlapping RF channels to produce effectively three times the bandwidth for this communication. As additional PCDs 110 come into communication with the wireless AP 120A, wireless AP 120A may selectively allocate different channels to different ones of these PCDs 110 as needed. Further, if more than three computing devices are communicating with wireless AP 120A, wireless AP 120A may partition one or more of the respective channels for the respective PCDs 110, such as using wireless Ethernet Collision Sense Multiple Access/Collision Detection (CSMA/CD) or other multiple access schemes such as TDMA, FDMA, or CDMA, among others.

In one embodiment, as described above with respect to block 77, a wireless AP of the wireless APs 120A-120B operates to direct a computing device 110 to an available channel, possibly based on one or more attributes associated with the access code received from the computing device 110. Thus the wireless AP, not the computing device, may assign channels for communication. For example, wireless AP 120B may operate to direct a computing device 110 to an available communication channel (e.g., an RF channel) based on the identification information, e.g., the System ID, received from the computing device 110. The wireless AP 120B may also operate to direct PCD 110 to an available communication channel based on other types of identification or authentication information, or on the determined access of the computing device. This allows wireless AP 120B to separate the communication traffic onto different channels based on the network provider being used, or based on the access or privilege level of computing device 110. For example, wireless AP 120B may assign a computing device 110 a communication channel based on whether the computing device 110 has access to private portions of the network.

Other Types of Entities

In various embodiments, other types of entities may possibly participate in one or more systems and/or methods described herein in lieu of or in addition to carriers. These other types of entities may include any entity which may have a group that may use services described above. For example, a bank may offer services described herein at one or more retail entity locations to its account holder and/or credit card holders. For instance, a holder of a MasterCard® or a specific MasterCard, such as offered by a specific bank (e.g., MBNA or Capital One, among others), may be allowed access at one or more retail entities by submitting his or her MasterCard information. In various examples, a college or university may offer services described herein at one or more retail entity locations to its students, professors, alumni, and/or staff; or an on-line dating service may offer services described herein at one or more retail entity locations to its subscribers; among other types of entities.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed:

1. A method comprising:
   establishing, at a wireless access point, a first virtual local area network, the first virtual local area network reserving a first bandwidth portion of a total bandwidth available to the wireless access point, the first virtual local area network reserved for back office services;
   establishing, at the wireless access point, a second virtual local area network, the second virtual local area network using a second portion of the total bandwidth not reserved by the first virtual local area network, the first virtual local area network distinct from the second virtual local area network, and the second virtual local area network reserved for carrier entity services;
   receiving, at the wireless access point from a computing device, via a wireless local area network, carrier identification information, wherein the carrier identification information corresponds to a carrier entity;

receiving, at the wireless access point from a second computing device, via the wireless local area network, second carrier identification information, wherein the second carrier identification information corresponds to a second carrier entity that is distinct from the carrier entity;

sending, from the wireless access point via a second network, the carrier identification information to a network management device;

sending, from the wireless access point via the second network, the second carrier identification information to the network management device;

receiving, at the wireless access point from the network management device via the second network, authorization data indicating that the computing device is authorized to receive a service;

receiving, at the wireless access point from the network management device via the second network, second authorization data indicating that the second computing device is authorized to receive a second service;

after receiving the authorization data, receiving, at the wireless access point via the wireless local area network, identification information from the computing device, wherein the identification information is associated with a digital content item accessible using the service;

after receiving the second authorization data, receiving, at the wireless access point via the wireless local area network, second identification information from the second computing device, wherein the second identification information is associated with a second digital content item accessible using the second service;

selecting a first subset of data packets from first data packets corresponding to the digital content item and second data packets corresponding to the second digital content item based on a speed corresponding to the second virtual local area network;

transmitting the first subset of data packets over a first time period;

selecting a second subset of data packets from the first data packets and the second data packets, wherein the second subset of data packets is selected such that the second subset of data packets includes the same number of data packets as the first subset of data packets; and transmitting the second subset of data packets over a second time period with a length corresponding to the first time period.

2. The method of claim 1, wherein the digital content item is accessible during a particular time.

3. The method of claim 1, further comprising:
sending a first request for the digital content item to the carrier entity;
sending a second request for the second digital content item to the second carrier entity, the first request and the second request sent using the second virtual local area network;
receiving, at the wireless access point from a third computing device, a data transmission, wherein the data transmission is associated with a back office application;
transmitting the data transmission to a data server, using the first virtual local area network; and
receiving, at the wireless access point, the first data packets and the second data packets.

4. The method of claim 3, wherein the first request is sent to a content server located at a retail establishment.

5. The method of claim 1, further comprising broadcasting a wireless local area network signal to a coverage area that includes a retail establishment.

6. The method of claim 1, wherein the carrier identification information includes a first system identification associated with the carrier entity, wherein the second carrier identification information includes a second system identification associated with the second carrier entity, wherein the carrier identification information is received via a first virtual wireless network of the wireless local area network, the first virtual wireless network associated with the first system identification, wherein the second carrier identification information is received via a second virtual wireless network of the wireless local area network, the second virtual wireless network associated with the second system identification, and wherein the first virtual wireless network is distinct from the second virtual wireless network.

7. The method of claim 1, wherein the wireless access point accesses the second network via a wired network connection.

8. The method of claim 1, further comprising:
prior to sending the carrier identification information to the network management device, transmitting a first carrier content item to the computing device, wherein the first carrier content item is associated with the carrier entity; and
prior to sending the second carrier identification information to the network management device, transmitting a second carrier content item to the second computing device, wherein the second carrier content item is associated with the second carrier entity, wherein the first carrier content item is distinct from the second carrier content item, wherein the computing device and the second computing device are distinct, and wherein the carrier entity and the second carrier entity are distinct.

9. A computer readable storage device storing instructions that, when executed by a processor, cause the processor to perform operations comprising:
establishing, at a wireless access point, a first virtual local area network, the first virtual local area network reserving a first bandwidth portion of a total bandwidth available to the wireless access point, the first virtual local area network reserved for back office services;
establishing, at the wireless access point, a second virtual local area network, the second virtual local area network using a second portion of the total bandwidth not reserved by the first virtual local area network, the first virtual local area network distinct from the second virtual local area network, and the second virtual local area network reserved for carrier entity services;
receiving, from a computing device, via a wireless local area network, carrier identification information, wherein the carrier identification information corresponds to a carrier entity;
receiving, from a second computing device, via the wireless local area network, second carrier identification information, wherein the second carrier identification information corresponds to a second carrier entity that is distinct from the carrier entity;
sending, via a second network, the carrier identification information to a network management device;
sending, via the second network, the second carrier identification information to the network management device;

receiving, from the network management device via the second network, authorization data indicating that the computing device is authorized to receive a service;

receiving, from the network management device via the second network, second authorization data indicating that the second computing device is authorized to receive a second service;

after receiving the authorization data, receiving, via the wireless local area network, identification information from the computing device, wherein the identification information is associated with a digital content item accessible using the service;

after receiving the second authorization data, receiving, via the wireless local area network, second identification information from the second computing device, wherein the second identification information is associated with a second digital content item accessible using the second service;

selecting a first subset of data packets from first data packets corresponding to the digital content item and second data packets corresponding to the second digital content item based on a speed corresponding to the second virtual local area network;

transmitting the first subset of data packets over a first time period;

selecting a second subset of data packets from the first data packets and the second data packets, wherein the second subset of data packets is selected such that the second subset of data packets includes the same number of data packets as the first subset of data packets; and transmitting the second subset of data packets over a second time period with a length corresponding to the first time period.

10. The computer readable storage device of claim 9, further comprising sending a first request for the digital content item to a content server located at a retail establishment.

11. The computer readable storage device of claim 9, wherein the digital content item is accessible during a particular time.

12. The computer readable storage device of claim 9, wherein retrieval of the digital content item is via a third network accessed via the network management device.

13. The computer readable storage device of claim 9, wherein the operations further comprise presenting the digital content item in a menu of multiple selectable digital content options.

14. The computer readable storage device of claim 9, wherein the operations further include broadcasting a wireless local area network signal to a coverage area that includes a retail establishment.

15. An apparatus comprising:
a processor; and
a memory, wherein the memory stores instructions that, when executed by the processor, cause the processor to perform operations comprising:
establishing, at a wireless access point, a first virtual local area network, the first virtual local area network reserving a first bandwidth portion of a total bandwidth available to the wireless access point, the first virtual local area network reserved for back office services;
establishing, at the wireless access point, a second virtual local area network, the second virtual local area network using a second portion of the total bandwidth not reserved by the first virtual local area network, the first virtual local area network distinct from the second virtual local area network, and the second virtual local area network reserved for carrier entity services;
receiving, from a computing device, via a wireless local area network, carrier identification information, wherein the carrier identification information corresponds to a carrier entity;
receiving, from a second computing device, via the wireless local area network, second carrier identification information, wherein the second carrier identification information corresponds to a second carrier entity that is distinct from the carrier entity;
sending, via a second network, the carrier identification information to a network management device;
sending, via the second network, the second carrier identification information to the network management device;
receiving, from the network management device via the second network, authorization data indicating that the computing device is authorized to receive a service;
receiving, from the network management device via the second network, second authorization data indicating that the second computing device is authorized to receive a second service;
after receiving the authorization data, receiving, via the wireless local area network, identification information from the computing device, wherein the identification information is associated with a digital content item accessible using the service;
after receiving the second authorization data, receiving, via the wireless local area network, second identification information from the second computing device, wherein the second identification information is associated with a second digital content item accessible using the second service; sending a first request for the digital content item to the carrier entity;
selecting a first subset of data packets from first data packets corresponding to the digital content item and second data packets corresponding to the second digital content item based on a speed corresponding to the second virtual local area network;
transmitting the first subset of data packets over a first time period;
selecting a second subset of data packets from the first data packets and the second data packets, wherein the second subset of data packets is selected such that the second subset of data packets includes the same number of data packets as the first subset of data packets; and
transmitting the second subset of data packets over a second time period with a length corresponding to the first time period.

16. The apparatus of claim 15, wherein the identification information includes a payment discount for the digital content item.

17. The apparatus of claim 15, wherein the identification information includes a code received by the computing device.

18. The apparatus of claim 15, wherein the operations further comprising initiating presentation at the computing device of a menu of multiple selectable digital content options.

19. The apparatus of claim 15, wherein the carrier identification information includes a system identifier, a media access control address, a service set identifier, an extended service set identifier, a basic service set identifier, or a combination thereof.

20. The method of claim 1, wherein retrieval of the digital content item is via a third network accessed via the network management device.

21. The method of claim 20, wherein the second network is distinct from the third network.

22. The method of claim 21, wherein the second network includes a proprietary wide area network, and wherein the third network includes the Internet.

23. The method of claim 20, wherein the digital content item is stored on a server accessible via a fourth network communicatively coupled to the third network.

24. The method of claim 1, wherein retrieval of the digital content item is via a third network.

25. The method of claim 24, wherein the third network includes the Internet.

* * * * *